Jan. 19, 1954  R. J. EHRET ET AL  2,666,889
CONTROL APPARATUS
Filed March 15, 1951  3 Sheets-Sheet 1
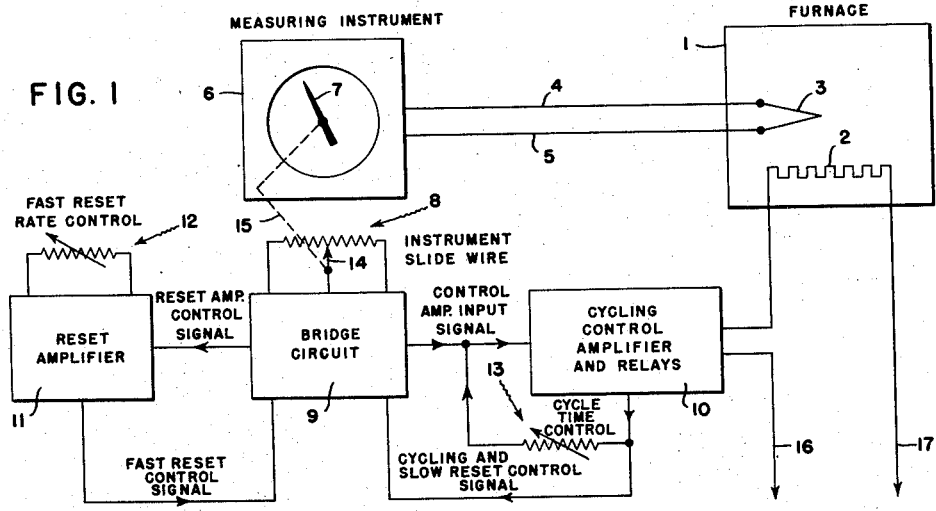
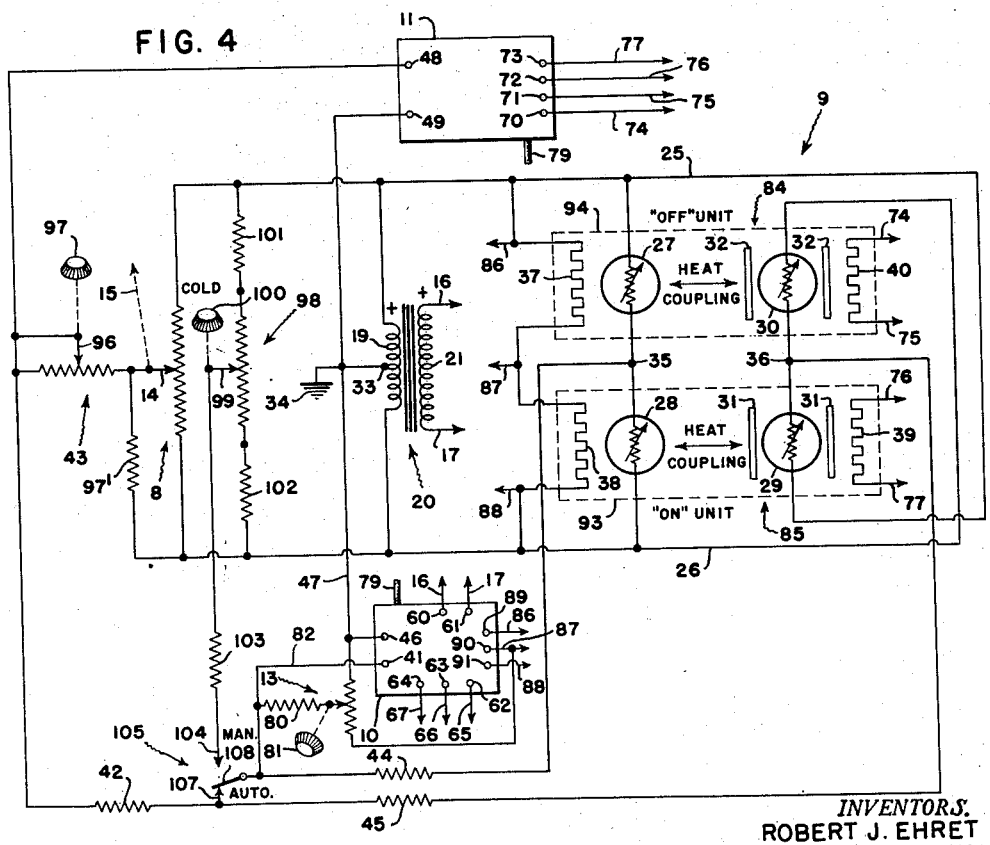
INVENTORS.
ROBERT J. EHRET
ROGER F. WERNLUND
BY Arthur H. Swanson
ATTORNEY.

Jan. 19, 1954  R. J. EHRET ET AL  2,666,889
CONTROL APPARATUS
Filed March 15, 1951  3 Sheets-Sheet 2

INVENTORS.
ROBERT J. EHRET
ROGER F. WERNLUND
BY Arthur H. Swanson
ATTORNEY.

INVENTORS.
ROBERT J. EHRET
ROGER F. WERNLUND
BY
Arthur H. Swanson
ATTORNEY.

Patented Jan. 19, 1954

2,666,889

UNITED STATES PATENT OFFICE 2,666,889

CONTROL APPARATUS

Robert J. Ehret, Philadelphia, and Roger F. Wernlund, Southampton, Pa., assignors to Minneapolis-Honeywell Regulator Company, Minneapolis, Minn., a corporation of Delaware Application March 15, 1951, Serial No. 215,846

37 Claims. (Cl. 323—66)

The present invention relates generally to automatic electric control apparatus, and relates specifically to automatic electric proportioning control apparatus of the time-proportioning type, wherein a control action is made proportional in magnitude to the need therefor by adjustment of the ratio of the control "on" time to "off" time in accordance with the demand of the process or other arrangement being controlled.

A general object of the present invention is to provide improved automatic electric control apparatus of the time-proportioning type, by means of which proportional control of a process or other arrangement is effected in an improved manner by the automatic adjustment of the ratio of the control "on" time to the control "off" time in accordance with the demand or need for control action of the controlled arrangement.

In the automatic control of processes requiring a proportional type of control for proper operation, numerous processes have been encountered which cannot tolerate so-called throttling control, wherein the instantaneous rate of flow of an agent is made proportional to a measured value of a controlled condition. Examples of such processes are certain fuel-fired ones which cannot tolerate fuel valve throttling in the control of fuel flow rate to maintain a constant temperature.

As an illustration, it is noted that a wide car bottom furnace must be fired at maximum rate, when heat is needed, in order that the flame be uniformly distributed so as to produce the same degree of heat across the charge. In such a furnace, if the temperature is controlled by proportional adjustment or throttling of the rate of fuel flow, undesirably uneven heating of the charge occurs.

However, if the temperature of such a furnace is controlled on a time-proportioning basis, uniform heating across the charge results. Such control is effected by operating the fuel supply valve between maximum and minimum open positions, and by proportioning the fuel input to the furnace in pulses, the ratio, during any given period, of "valve maximum open" or "on" time to the total period of time being made proportional to the need for heat as indicated by the measured furnace temperature. By definition, the total time is equal to the "valve maximum open" or "on" time plus the "valve minimum open" or "off" time.

Time proportioning control is also required for the control of the temperature of electric furnaces where it is not feasible to vary the furnace heater energizing current between its maximum and minimum or "off" values, and where, therefore, the heating current must be fully on when heat is called for. The control apparatus of the present invention fulfills this requirement by proportioning or regulating the furnace heat input by varying the ratio of heating current "on" time to total time in accordance with the furnace load demand.

Accordingly, it is an object of the present invention to provide control apparatus of the type specified above which is extremely well adapted to effect close, accurate control of the value of a condition by proportioning the ratio of control "on" time to total time as required to maintain said value at a predetermined, desired figure, and which effects such control electronically, with a minimum of control action lag or delay and with a minimum of over-compensation, thereby reducing to a minimum any tendencies of the apparatus to over-shoot or hunt.

A specific object of the invention is to provide electronic time-proportioning control apparatus of the type specified which includes an electronically operated controllable automatic reset portion capable of providing and maintaining required reset effects in the apparatus, whereby the occurrence of "offset" or "droop" in the value of the controlled condition from a desired value is prevented, and whereby the magnitude of excursions of the controlled condition from the desired value is kept at an absolute minimum at all times.

Another specific object of the invention is to provide apparatus of the specified type which provides a desirable rate response action in effecting its controlling functions.

A more specific object of the invention is to provide control apparatus of the type just specified wherein the proportional cycling and reset functions are performed by temperature sensitive resistors which are selectively heated by suitable heaters, the latter in turn being controlled by electronic amplifiers whose heater controlling actions are influenced by the value of the controlled condition and by the resistance values of the temperature sensitive resistors.

Other specific objects of the present invention are to provide control apparatus of the type above specified including means for adjusting the rate of operation of the automatic reset means over a wide range of operating values, and to provide in such apparatus approach rate control means for limiting the reset rate to a controlled maximum value in one direction only.

A still more specific object of the invention is to provide control apparatus as specified above including an adjustable feedback connection for providing accurate control of the cycle time of the apparatus without adversely affecting the sensitivity thereof.

An even more specific object of the present invention is to provide control apparatus of the type last specified wherein the various controls, such as for proportional band, cycle time, and reset rate, act independently of one another, whereby the adjustment of the characteristics of the control apparatus to suit the characteristics of the process to be controlled is rendered as simple as possible.

Another more specific object of the invention is to provide control apparatus as specified above which includes the necessary circuit components and connections to provide so-called safe-failure of the apparatus upon the development of various component defects therein.

When suitably connected to a process or other arrangement to be controlled, the apparatus of the present invention is operative to effect time-proportioning control actions so as to maintain a selected condition of the process at a predetermined, desired value. When that condition is the temperature within an electric furnace, for example, and when this temperature is exactly at the predetermined or control point value, the load relay of the apparatus will be cycled in such a manner that the furnace heater will be alternately energized and deenergized, the ratio, during each cycle, of heater energized or "on" time to the total cycle time being that required to maintain the control point temperature within the furnace. (Total time equals "on" time plus "off" time.)

Upon a deviation in the furnace temperature from the control point value, due to a furnace load or similar change, the furnace heater will be energized for a greater or a lesser portion of each cycle, depending upon the direction of the temperature deviation. The magnitude of this corrective effect or change in "on"—total time ratio will be proportional to the extent and rate of the temperature deviation. Thus, the average rate of heat input to the furnace will be changed in accordance with the rate and extent of the departure of the temperature from the control point.

Also upon a temperature deviation as just discussed, the reset portion of the apparatus becomes effective to perform its function of producing an effect in the apparatus which causes the ratio of furnace heater "on" time to total time to be changed further in the same direction as it was changed by the temperature deviation. An additional corrective effect in the rate of heat application is thereby produced, the magnitude of this effect being dependent upon the extent of the original temperature deviation, and upon the rate of reset at which the apparatus is set to operate.

Accordingly, the above described operation will be that required to adjust the average rate of heat input to the furnace as necessary to minimize the magnitude of the temperature excursion, and to return the temperature exactly to the control point value with a minimum of over-correction. Once the furnace temperature has been so returned to the control point value, the cycling operation of the relay and furnace heater will continue at the new rate in the presence of the established reset effect until a subsequent temperature deviation occurs.

The various features of novelty which characterize this invention are pointed out with particularity in the claims annexed to and forming a part of this specification. For a better understanding of the invention, however, its advantages, and specific objects obtained with its use, reference should be had to the accompanying drawings and descriptive matter in which is illustrated and described a preferred embodiment of the invention.

Of the drawings:

Fig. 1 illustrates in modified block diagram form a preferred embodiment of the control apparatus of the present invention in combination with a furnace whose temperature is to be controlled;

Fig. 4 is a circuit diagram illustrating in still more detail the apparatus of Fig. 1;

Description of the Fig. 1 apparatus

Figure 2:
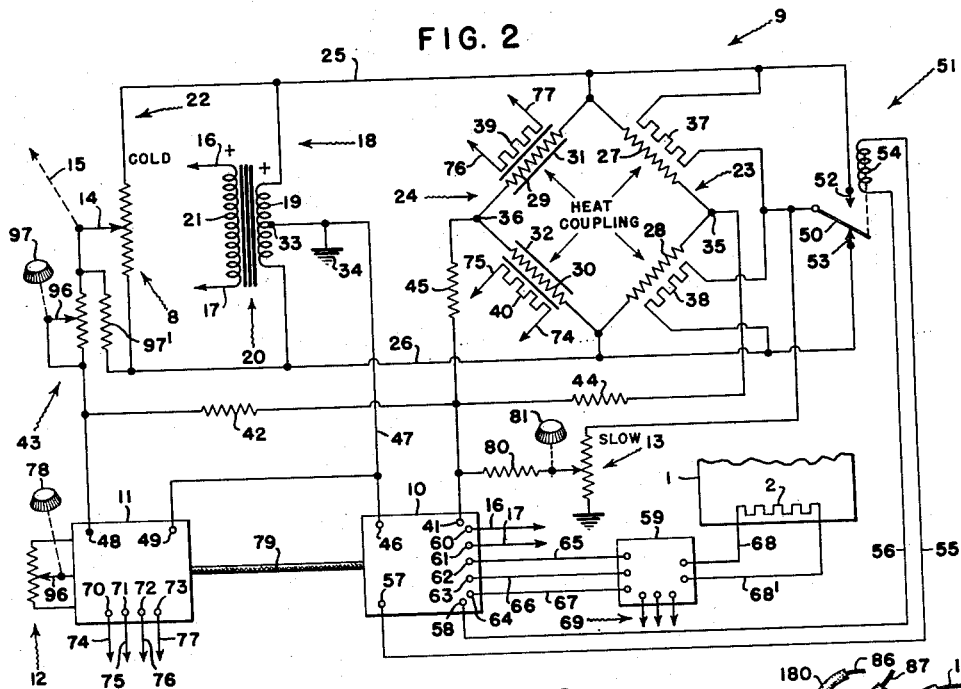
Fig. 2 is a circuit diagram illustrating in more detail certain portions of the control apparatus of Fig. 1.

In Fig. 1, we have illustrated in modified block diagram form a preferred embodiment of the time-proportioning control apparatus of the present invention in combination with a furnace, the temperature of which is to be controlled by the apparatus so as to be maintained at a predetermined, desired value. This showing of an electric furnace as the device controlled by the apparatus of the present invention is made by way of example, the control apparatus being well adapted to control widely different devices or processes also, such as the wide car bottom furnace mentioned hereinbefore, rotary kilns, and other arrangements for use with which time-proportioning control is desirable if not requisite.

The electric furnace of the Fig. 1 arrangement is designated at 1, and contains a heating element or heater 2 of the usual form for heating the furnace 1 in the conventional manner. Within the furnace 1 is also a thermocouple 3 which is adapted to respond to the furnace temperature. The thermocouple 3 is connected by conductors 4 and 5 to the input of a measuring instrument 6, shown as being of the circular scale type and having a temperature indicator 7 which is power-positioned by the instrument 6 so as to indicate by its position the temperature within the furnace 1 as measured by the thermocouple 3.

The control apparatus portion of the Fig. 1 arrangement includes a control or instrument slidewire 8, a control or bridge circuit 9, a cycling control amplifier 10 including control relays, and a reset amplifier 11. Also shown in Fig. 1 are a fast reset rate control 12 and a cycle time control 13.

As shown in Fig. 1, the instrument slidewire 8 includes a movable contact 14 which is mechanically coupled by a linkage 15 to the indicator 7 of the instrument 6 in such a manner that the contact 14 is positioned along the slidewire 8 in accordance with the furnace temperature as measured by the instrument 6. Throughout the following description, the predetermined value at which the control apparatus is intended to maintain the furnace temperature will be referred to as the control point temperature, and it will be assumed that, when the furnace temperature is at the control point value, the instrument 6 will position the contact 14 at the mid-point of the instrument slidewire 8. Accordingly, the contact 14 is shown in Fig. 1 as being in the control point position, or simply at the control point.

As those skilled in the art will understand, the particular measured furnace temperature at which the instrument slidewire contact 14 assumes the control point position can be adjusted in the known manner by adjustment of the mechanical linkage 15 which connects the instrument indicator 7 with the contact 14.

The slidewire 8 is connected to the bridge circuit 9 which in turn is operative to supply proper control signals to the inputs of the cycling control and reset amplifiers 10 and 11. Each of the latter supplies control signals to the bridge circuit 9, all as shown in Fig. 1. The fast reset rate control 12 is connected internally to the reset amplifier 11, while the cycle time control 13 is connected between the output and input of the amplifier 10. The furnace heater 2 is connected to energizing current supply lines 16 and 17 through the relays included in the amplifier 10.

Operation of the Fig. 1 apparatus

In describing the operation of the time-proportioning control apparatus of Fig. 1, let it be assumed that the temperature of the furnace 1 is at the control point value, whereby the contact 14 will be positioned at the control point. Under this condition, there will be no control signal applied to the reset amplifier 11 from the bridge circuit 9, but the latter will supply a control signal to the input of the control amplifier 10 in accordance with the characteristics of the cycling and slow reset control signal fed back from the amplifier 10, whereby the flow of energizing current to the furnace heater 2 will be initiated and interrupted alternately in a manner tending to maintain the furnace temperature constant at the control point value.

To this end, the control signal applied to the input of the amplifier 10 will cause cyclic operation of the control relay of the amplifier at a predetermined rate, this rate being determined by the setting of the cycle time control 13 in a manner to be described in detail hereinafter. During a portion of each cycle of operation of the amplifier control relay, the relay will be energized or in the "on" position, and hence will supply energizing current to the heater 2 and will cause heat to be supplied to the furnace 1 at the maximum rate. The remainder of each of these operating cycles will consist of a portion in which the relay is deenergized or in the "off" position, during which portion the energizing current to the furnace heater will be turned off and no heat will be supplied to the furnace 1. If desired, the apparatus can be arranged to supply heat to the furnace at a minimum rate when the control relay is in the "off" position instead of supplying no heat at all as in the illustrated arrangement.

Under the operating condition being described, in which the controlled furnace temperature is at the control point value, the ratio of the relay and heater current "on" time to total time may be such as to cause heat to be supplied to the furnace 1 at an average rate which is sufficient to cause the furnace temperature to be maintained constant at the control point value. If this condition prevails, the slidewire contact 14 will be maintained at the control point, and the control relay of the amplifier 10 will continue to cycle with the required ratio of heater "on" time to total time. Upon the occurrence of a deviation in the measured furnace temperature from the control point value, the instrument 6 will cause the contact 14 to be displaced a proportional amount from the control point in a direction corresponding to that of the temperature deviation. If it be assumed that a temperature decrease occurs, let it also be assumed that the contact 14 is moved to the right along the slidewire 8 of Fig. 1. Such a furnace temperature decrease or drop might be caused by an increase in furnace load, a decrease in the energizing voltage between the supply conductors 16 and 17, or by any one of other, well-known occurrences.

When the furnace temperature decreases and causes movement of the slidewire contact 14 to the right in Fig. 1, the bridge circuit 9 will change the input signal to the amplifier 10 as necessary to increase the ratio of the length of the portion of each operating cycle in which energizing current is supplied to the furnace heater 2 to the total length of the cycle. In other words, a control signal will be applied from the bridge 9 to the amplifier 10 which will increase the percent "on" time or ratio of the heater "on" time to total time. Neglecting momentarily the rate action effected by the apparatus, which action will be described in detail hereinafter, the percent "on" time will be increased by an amount which is substantially proportional to the extent of displacement of the contact 14 and hence proportional to the decrease in furnace temperature and to the increase of average heat input rate to the furnace needed to return the furnace temperature to the control point value.

Reset

At this point, it appears to be desirable to define the terms which will be employed consistently herein in describing the various phases, operation, and states of the phenomenon known as reset as it is produced and functions in the present apparatus. In the following discussion, the terms "reset" or "reset effect" will refer to the conditions established in the apparatus which cause different rates of furnace heat input to be maintained under different furnace load or analogous conditions as necessary to hold the controlled temperature at the control point value. The terms "reset action" or "changes in reset" will refer to changes in the effective magnitude of the reset, or simply to changes in the reset effect, while the terms "rate of reset" or "reset rate" will refer to the rate at which the reset action takes place, or simply the rate at which changes in the reset effect are produced.

As will be explained more fully hereinafter, the present apparatus is operative to provide two types of control of the bridge circuit 9 which result in the production of reset effects in the operation of the apparatus. Specifically, under appropriate conditions to be discussed below, the reset amplifier 11 is operative by means of the fast reset control signal to cause the bridge circuit 9 to effect a reset action, and hence to change the magnitude of the reset effect present in the apparatus, at a controllable, relatively fast rate; this rate being determined by the setting of the control 12. The reset effects so produced, and the apparatus components and signals involved in producing these effects, will, for convenience of explanation, be identified herein by the term "fast." Thus, for example, the output signal from the reset amplifier 11 has been termed a "fast reset control signal," and the reset effects established by this signal will be hereinafter referred to as "fast reset effects," established by the "fast reset action."

In addition to the above, the control amplifier 10 is operative under appropriate conditions to cause the bridge circuit 9 to effect a reset action and to change at a fixed, relatively slow rate the magnitude of the reset effect present in the apparatus, this action being accomplished through the medium of the slow reset control signal. In order to distinguish this operation from that of the fast reset arrangement described above, the reset effects produced under the control of the amplifier 10, and the apparatus components and signals involved in producing these effects, will be identified herein by the term "slow." Thus, for example, the reset effects established by the amplifier 10 will be hereinafter referred to as "slow reset effects," these effects being produced by the slow reset control signal. It is to be understood, however, that once reset effects are established in the apparatus, they exercise exactly the same effect on the control functions of the apparatus, no matter whether they are produced at a fast rate by the fast reset portion of the apparatus or at a slow rate by the slow reset portion thereof.

Continuing the description of the operation of the subject control apparatus, the bridge circuit 9 will apply an appropriate control signal to the input of the reset amplifier 11 as soon as the instrument slidewire contact 14 is displaced from the control point. The amplifier 11 in turn will then feed back to the bridge circuit 9 a fast reset control signal which will have the effect of more or less gradually increasing to an even greater extent the relay "on"—total time ratio, and which will, therefore, increase further the rate of heat application to the furnace 1. In other words, the fast reset control signal applied to the bridge circuit 9 will modify the input signal sent to the amplifier 10 so as to increase gradually the relay "on"—total time ratio and the average rate of furnace heat input above the new, higher values to which these quantities were quickly raised by the change in the control signal produced by the displacement of the contact 14. It will be noted that the effect of the operation of the reset amplifier 11 is to control additionally the amplifier 10 in a gradual manner and in the same sense as the control effected by the slidewire contact.

A change in the relay "on"—total time ratio also produces the aforementioned slow reset action by means of which the magnitude of the reset effect already established in the apparatus by the fast reset action is further increased at a relatively slow rate. Accordingly, the fast and slow reset actions cooperate in changing the amount of reset effect present in the apparatus as required to insure minimum departure from, and quick return to, the control point value of the controlled temperature.

Since the theory of automatic reset and the advantages obtained therewith are generally well-known in the art, no detailed description of the basic concepts thereof appears to be necessary herein. Suffice it to say, therefore, that the application of the fast and slow reset control signals to the bridge circuit 9 causes the fast reset action to effect a relatively rapid change in the average rate of furnace heat input, in the same direction as and in addition to the so-called proportional change, and secondly causes the slow reset action to effect an additional relatively slow change in the average heat input rate in the same direction. Although the fast reset action is terminated upon return of the temperature to the control point value, as will be explained hereinafter, the necessary reset effects are maintained in the apparatus and continue to provide the necessary control of the amplifier 10 so as to permit the rate of heat input to the furnace to be maintained at an increased value even though the furnace temperature has returned precisely to the control point value.

Before completing the discussion of the reset effects produced in the apparatus, it should be noted that the rate at which the amplifier 11 controls the fast reset action within the apparatus is determined by the setting of the fast reset rate control 12. As will be described below, the magnitude of the fast reset control signal supplied to the bridge circuit 9 by the reset amplifier 11 is substantially proportional to the amount of displacement of the contact 14 from the control point over the normal operating range of this contact.

Summarizing the above, in the operation of the apparatus disclosed in Fig. 1, a load or other analagous change associated with the furnace 1 which causes a decrease in the furnace temperature below the control point value will at once produce proportional movement of the instrument slidewire contact 14 from the control point which in turn will quickly proportionally increase the percent of heater energizing current "on" time, with the result that the rate of heat input to the furnace will be proportionally increased. While the increased rate of furnace heat input is acting to return the furnace temperature to the control point value, the signal from the reset amplifier 11 will be effective to modify the signal applied to the amplifier 10 from the bridge circuit 9 in such manner as to increase the rate of heat input to the furnace even though the temperature therein is increasing toward the control point value and the contact 14 is moving back toward the control point. Finally, the operation of the apparatus will stabilize in such a manner that there will be present in the apparatus the required magnitude of reset effect for the purpose of maintaining the increased rate of furnace heat input needed to hold the furnace temperature substantially at the control point value in the face of the increased furnace load or analagous condition.

Description of the Fig. 2 apparatus

The manner in which the apparatus of Fig. 1 performs the operation described above, and the manner in which the apparatus is constructed so as to carry out its operation, will be described in the following paragraphs in connection with Figs. 2 through 6. Thus, Fig. 2 illustrates the control apparatus of Fig. 1 of the present invention in somewhat more detail than is shown in Fig. 1, especially in connection with the bridge circuit 9. As can be seen from Fig. 2, the bridge circuit 9 includes an energizing branch 18 having therein the secondary winding 19 of a bridge-energizing transformer 20. The latter also has a primary winding 21 which is connected to, and energized from, the electrical supply conductors 16 and 17. For the purposes of the following description, it will be assumed that the conductors 16 and 17 supply to the apparatus alternating current of commercial voltage and frequency: namely, 115 volts and 60 C. P. S.

The bridge 9 also comprises an instrument slidewire branch 22, including the slidewire 8, a cycling follow-up branch 23, and a reset branch 24. Each of branches 18, 22, 23, and 24 is connected in parallel with each of the other branches by means of energizing conductors 25 and 26.

The cycling follow-up branch 23 includes an "off" resistor 27 and an "on" resistor 28 connected in series between the conductors 25 and 26. Similarly, the reset branch 24 includes an "on" resistor 29 and an "off" resistor 30 connected in series between the conductors 25 and 26. For a purpose to be noted hereinafter, devices having high thermal capacitance and designated at 31 and 32 are respectively associated with the resistors 29 and 30.

The secondary winding 19 of the transformer 20 is provided with a center-tap connection or terminal 33 which is connected, as shown, to the ground system of the apparatus at 34. Accordingly, the combination of the slidewire branch 22 and the energizing branch 18 can be conveniently called a slidewire bridge 22—18, having at one output terminal the contact 14 of the slidewire 8, and having at its other output terminal the terminal 33. Thus, the slidewire bridge 22—18 will produce between its output terminals 14 and 33 an alternating voltage signal dependent in magnitude upon the amount of displacement between the contact 14 and its mid-point or control point position, and having a phase which is either the same as, or is displaced substantially 180° from, the phase of the supply voltage between the conductors 16 and 17, depending upon the direction of the displacement of the contact 14 from the control point. The phase of the voltage between the conductors 16 and 17, and of the voltage between the conductors 25 and 26, will hereinafter be referred to as the supply voltage or reference phase.

In a similar manner, the combination of the cycling follow-up branch 23 and the energizing branch 18 of the bridge circuit 9 can be conveniently called a follow-up bridge 23—18. The first output terminal of this bridge is the junction 35 between the resistors 27 and 28, and the second output terminal of this bridge is the terminal 33. In like manner, the reset branch 24 and the energizing branch 18 can be conveniently defined as a reset bridge 24—18, having the junction 36 between the resistors 29 and 30 as its first output terminal, and having the terminal 33 as its second output terminal.

As will be obvious from a consideration of Fig. 2, the output of the follow-up bridge 23—18 appearing between the terminals 35 and 33 will be an alternating current signal having a magnitude dependent upon the difference between the resistance of the resistor 27 and the resistance of the resistor 28. Thus, when the resistances of the resistors 27 and 28 are equal, the output of the follow-up bridge will be zero. Further, the follow-up bridge output signal will have a phase which is either the same as that of the supply voltage between the conductors 16 and 17 or is 180° out of phase with said supply voltage, depending upon which of resistors 27 and 28 has the lower resistance value. Similarly, the output of the reset bridge 24—18 between the terminals 36 and 33 will be an alternating current signal of a magnitude dependent upon the relative resistances of the resistors 29 and 30, and having a phase dependent upon which of resistors 29 and 30 has the lower resistance value.

For the purpose of permitting the resistances of the resistors 27, 28, 29, and 30 to be relatively varied, each of these resistors is a temperature sensitive resistor having a substantial negative temperature coefficient of resistance. In addition, in order to control the resistance of each of the resistors 27, 28, 29, and 30, each of the latter has associated therewith a separate heater adapted to control the temperature of the respective resistor. Thus, thermally associated with the "off" follow-up resistor 27 is an "off" follow-up heater 37, and thermally associated with the "on" follow-up resistor 28 is an "on" follow-up heater 38. In like manner an "on" reset heater 39 is thermally associated with the "on" reset resistor 29, while an "off" reset heater 40 is thermally associated with the "off" reset resistor 30.

As noted in the description relative to Fig. 1, the cycling control and follow-up amplifier 10 and the reset amplifier 11 are controlled by signals supplied from the bridge circuit 9. Specifically, as can be seen from Fig. 2, the amplifier 10 is controlled in accordance with the relative magnitudes and phases of four signals: namely, the output signal from the slidewire bridge 22—18, the output signal from the follow-up bridge 23—18, the output signal from the reset bridge 24—18, and a cycle time control signal supplied through the cycle time control 13 in a manner to be described hereinafter. In order to accomplish this, one input terminal 41 of the amplifier 10 is connected through resistors 42 and 43 to the output terminal 14 of the slidewire bridge, and is connected through a resistor 44 to the output terminal 35 of the follow-up bridge. The input terminal 41 is also connected through a resistor 45 to the output terminal 36 of the reset bridge, and to the cycle time control resistor in a manner to be later described. The other input terminal 46 of the amplifier 10 is connected by a grounded conductor 47 to the terminal 33 of the energizing branch 18, whereby the outputs of the slidewire, follow-up, and reset bridges are effectively connected in parallel across the input of the amplifier 10. Accordingly, the latter is jointly controlled by four signals through the circuits just described.

The reset amplifier 11 is controlled solely in accordance with the output signal of the slidewire bridge 22—18, and, to this end, one of the input terminals 48 of the amplifier 11 is connected to the terminal or contact 14 of the slidewire bridge through the resistor 43, while the other input terminal 49 of the amplifier 11 is connected to the energizing branch terminal 33 by the grounded conductor 47. As a result of these connections, the reset amplifier 11 is controlled in accordance with the magnitude and direction of displacement of the contact 14 from the control point along the instrument slidewire 8.

The heating of the cycling follow-up heaters 37 and 38 is controlled by the amplifier 10, and hence by the resultant of the three output signals of the three bridges constituting the bridge circuit 9, neglecting momentarily the cycle time control signal. To this end, the heaters 37 and 38 are connected in series between the energizing conductors 25 and 26, whereby the heaters 37 and 38 would be substantially equally energized were it not for the controlling actions of the amplifier 10. As shown, a movable contact member 50 of a relay device 51 is connected to the junction between the heaters 37 and 38, while a normally open relay contact 52 and a normally closed relay contact 53 are respectively connected to the conductors 25 and 26. The relay 51 is actually included in the amplifier 10 of Fig. 1, and includes other contacts not shown in Fig. 2. However, the relay 51 has been shown in Fig. 2 physically removed from the amplifier 10 so as to make more clearly apparent the actual heater controlling connections between the amplifier 10, relay 51, and heaters 37 and 38. The operating coil or winding 54 of the relay 51 is shown as being connected by conductors 55 and 56 to the output terminals 57 and 58 of the amplifier 10.

As can readily be seen from Fig. 2, the relay contacts 50 and 52, when engaged, effectively short circuit the heater 37 and thereby deenergize the latter. Similarly, the relay contacts 50 and 53, when engaged, effectively short circuit and deenergize the heater 38. As noted above, the contacts 50 and 52 are normally out of engagement or open, which means that these contacts are closed only when the coil or winding 54 of the relay 51 is energized. The connections between the winding 54 and amplifier 10 are such that the relay 51 is deenergized when the resultant voltage applied to the amplifier input terminals 41 and 46 is zero. Accordingly, when an input signal of zero magnitude is applied to the amplifier input terminals 41 and 46, the relay 51 will be deenergized, no energizing current will be supplied to the heater 38, and full energizing current will be supplied to the heater 37. Since, as will be explained hereinafter, the load controlled by the Fig. 2 apparatus is also deenergized or turned off when the relay 51 is deenergized, the relay 51 is said to be in the "off" position when deenergized. It is for this reason that the heater 37 was earlier referred to as an "off" heater, since it is energized when there is no effective input signal applied to the amplifier 10, and the relay and controlled load are in the "off" condition.

When a signal of requisite magnitude and of the phase of the supply voltage is applied to the input terminals 41 and 46 of the amplifier 10, the relay 51 becomes energized, whereby the contacts 50 and 53 are opened and the contacts 50 and 52 are closed. This causes the complete deenergization of the heater 37 and full energization of the heater 38.

Since the load controlled by the apparatus is energized or turned on by the energization of the relay 51 as will be explained below, the energized condition of the relay 51 is referred to as the "on" condition thereof. This explains why the heater 38 was earlier referred to as an "on" heater, it being obvious from Fig. 2 that the heater 38 is energized when the relay 51 is in the energized or "on" condition.

Although the apparatus of Fig. 2 may be utilized to control a simple load in a direct on-off manner as the furnace heater 2 of Fig. 1 is controlled, we have illustrated in Fig. 2, by way of example, a more sophisticated form of control for the furnace heater 2. Thus, in Fig. 2, there is shown associated with the heater 2 a contactor device 59 which is operative to cause heat to be supplied to the furnace 1 at a high rate when the relay 51 is energized and a high rate of heat input to the furnace is needed, and to cause the heater 2 to supply heat at a minimum rate when the relay 51 deenergized. Such an arrangement has been found to be necessary, or at least desirable, in numerous heat controlling applications, as noted above.

Since it is assumed that the amplifier 10 of Fig. 2 includes the relay contacts which control the load, such as the furnace heater 2, the supply or energizing conductors 16 and 17 have been shown as being connected to energizing terminals 60 and 61 of the amplifier 10. The latter also has output terminals 62, 63, and 64 which are adapted to be connected to the load to be controlled. The terminal 62 is directly connected within the amplifier 10 to terminal 61, while terminal 63 becomes connected to terminal 60 when the relay 51 is deenergized. Accordingly, terminal 63 is referred to as an "off" terminal. When the relay 51 is energized, the terminal 60 is connected within the amplifier 10 to the terminal 64 in lieu of the terminal 63. For this reason, the terminal 64 is referred to as an "on" terminal. Terminals 63 and 64 may also be referred to as "cool" and "heat" terminals, respectively. Since the terminal 62 is actually a continuation of supply conductor 17, this terminal is referred to as the "common" terminal.

Conductors 65, 66, and 67 are shown as being connected to the respective terminals 62, 63, and 64 for connecting the amplifier relay to the controlled load through the contactor 59. If a simple load of the type represented by the furnace heater 2 were to be controlled in an on-off manner as is contemplated in Fig. 1, this load would be connected between the conductors 65 and 67. For loads of the type shown in Fig. 2 which require a minimum application of heat when the relay 51 is in the "off" position, the terminal 63 and conductor 66 are utilized. Thus, as shown in Fig. 2, the conductors 65, 66, and 67 are connected to the input or control terminals of the contactor 59, while the output or load terminals of the latter are connected by conductors 68 and 68' to the furnace heater 2. Energizing current for the heater 2 is supplied to the contactor 59 by the supply conductors 69. The latter are connected to a conventional three-wire energizing current supply system which is assumed herein to supply 115–230 volts to the apparatus in the well-known manner.

The contactor 59 is of the well-known and widely used form employed to connect a three-wire supply line to a two-wire load in such a manner that, in one operating condition of the contactor, the load will be energized at the lower of the two voltages of the three-wire supply. When in its second operating condition, the contactor 59 is adapted to energize the load with the higher of the two voltages of the three-wire supply. In Fig. 2, the operation of the relay 51 controls the contactor 59 and causes it to assume one or the other of its two operating conditions by virtue of the connection of the conductors 65, 66, and 67 between the amplifier 10 and the contactor 59.

Specifically, when the relay 51 is deenergized or in the "off" position, the contacts of this relay, included in the amplifier 10, cause the contactor 59 to energize the heater 2 through the conductors 68 and 68' with energizing current at a voltage of 115 volts, this voltage being the lower of the three-wire supply voltages as assumed above. Accordingly, under this condition, heat is supplied to the furnace 1 at a minimum rate as is desired.

When the relay 51 is energized or in the "on" position, however, the contactor causes the furnace heater 2 to be energized with a voltage of 230 volts, this being the higher of the two supply voltages. For this condition of operation, heat is supplied to the furnace 1 at a maximum rate. Accordingly, operation of the relay 51 between its "off" and "on" positions controls the contactor 59 as necessary to cause heat to be supplied to the furnace 1 at respectively minimum and maximum instantaneous rates.

The energization of the reset heaters 39 and 40 is controlled by the reset amplifier 11. To this end, the latter is provided with output terminals 70, 71, 72 and 73. The terminals 70 and 71 are connected by respective partially shown conductors 74 and 75 to the terminals of the "off" reset heater 40, while the terminals 72 and 73 of the amplifier 11 are connected by respective partially shown conductors 76 and 77 to the "on" reset heater 39. The amplifier 11 is so arranged, as will be brought out in detail hereinafter, that the heaters 39 and 40 will be substantially equally energized when no input signal is applied to the amplifier input terminals 48 and 49, as occurs when the contact 14 is at the control point. For an input signal to the amplifier 11 of requisite magnitude and of the same phase as that of the supply voltage, the "on" reset heater 39 will be energized to a greater extent than will the "off" reset heater 40. Such an input signal would result from upward movement of the instrument slidewire contact 14 from the control point, such upward movement being caused by a decrease in the measured furnace temperature below the control point value. Conversely, an increase above the control point value of the furnace temperature causes downward movement of the contact 14 in Fig. 2 and results in the application to the input terminals 48 and 49 of the reset amplifier 11 of a signal having a phase opposite to that of the supply voltage phase. This in turn causes the "off" reset heater 40 to be energized to a greater extent than is the "on" reset heater 39. In each case, the magnitude of the difference in energization of the two reset heaters 39 and 40 will be proportional to the amount of displacement of the contact 14 from the control point over the normal range of operation of the contact 14.

As previously noted in connection with Fig. 1, the fast reset rate control 12 of the reset amplifier 11 provides a means for regulating the rate at which reset is effected in the apparatus by the fast reset action. Electrically, the control 12 permits the adjustment of the amount of differential energization of the reset heaters 39 and 40 for a given magnitude of input signal applied between the terminals 48 and 49. The control 12 is provided with a suitable knob 79 by means of which manual adjustment of the reset rate may be effected.

As will be described in detail below in connection with the detailed circuit showing of Fig. 5, the reset amplifier 11 receives energizing power from the amplifier 10. For this purpose, a cable 79 is shown in Fig. 2 connected between the amplifiers 10 and 11.

Operation of the Fig. 2 apparatus

The specific manner in which the apparatus of Fig. 2 operates to effect the controlling actions broadly described in connection with Fig. 1 will now be described. For purposes of explanation, let it be assumed that conditions are such that the instrument slidewire contact 14 is at the control point, which condition is indicative of the fact that the furnace temperature is at the desired value. Under this condition, no input signal will be applied to the amplifier 10 from the slidewire bridge 22—18, since the contact or terminal 14 will be at the same potential as the terminal 33. Also, no input signal will be applied to the input of the amplifier 11 for the same reason. With no input signal applied to the amplifier 11, the reset heaters 39 and 40 will be equally energized. Let it also be assumed that this condition has prevailed for an appreciable length of time, and that the reset heaters 39 and 40 and the reset resistors 29 and 30 are all at substantially the same temperature. This implies that the reset resistors 29 and 30 are being heated equally also by the follow-up heaters 37 and 38, which condition exists solely when the apparatus is operating with a 50% "on" time and hence with equal average energization of the heaters 37 and 38. From another viewpoint, the condition of equal temperatures of the reset resistors 29 and 30 implies the absence of any fast or slow reset actions or effects in the apparatus at the time.

Since the resistors 29 and 30 can be made to have substantially equal resistances at a given temperature, and to have substantially equal temperature coefficients of resistance, the maintenance of the resistors 29 and 30 at the same temperature will cause the reset bridge 24—18 to apply no input signal to the amplifier 10, since the terminal 36 will be in the same potential as the terminal 33.

Cycling action

Although neither the slidewire bridge nor the reset bridge will be supplying an input signal to the amplifier 10 for the assumed conditions being discussed, an input signal to the amplifier 10 will be provided by the follow-up bridge 23—18. This signal will be a cycling one, due to the cycling operation of the follow-up bridge and relay 51. In explaining this cycling action, let the analysis be started at a time when the follow-up heaters 37 and 38 have so heated the respective follow-up resistors 27 and 28 as to cause these resistors to have equal resistance values. Since these resistors can be selected to have substantially the same resistances at a given temperature and to have the same temperature coefficients of resistance, the above assumed condition of equal resistance for the resistors 27 and 28 implies that these resistors will be at substantially the same temperature. For this condition, the terminal 35 will be at the same potential as the terminal 33, and no input signal to the amplifier 10 will be applied from the follow-up bridge. Consequently, no resultant signal will be applied to the input of the amplifier 10 at this instant, whereby the relay 51 will be deenergized as noted above.

For simplicity, the effects of the circuit including the cycle time control resistor 13 will not be considered at the present time. However, the operation of the cycle time control arrangement will be described in detail hereinafter.

As long as the relay 51 is deenergized, the "off" follow-up heater 37 will be energized, and the "on" follow-up heater 38 will be deenergized. Accordingly, the temperature of the resistor 27 will quickly increase above that of the resistor 28, whereby a potential difference will appear between the terminals 35 and 33. When this occurs, the relay 51 will be caused to assume its energized position, since an increase in the temperature of the resistor 27 above that of the resistor 28 will cause the resistance of the resistor 27 to decrease, thereby supplying to the amplifier 10 an input signal having the phase of the supply voltage. As soon as it is energized, the relay 51 will cause the closing of the contacts 50 and 52 and the opening of the contacts 50 and 53, thereby deenergizing the "off" heater 37 and energizing the "on" heater 38.

This reversal in the energization of the heaters 37 and 38 will cause the resistance of the "on" resistor 28 to decrease below the resistance of the "off" resistor 27, whereby the potential difference between the terminals 35 and 33 will be decreased. Consequently, the input signal to the amplifier 10 will be decreased, and may actually pass through zero and become 180° out of phase with the supply voltage. In any event, the reduction of the magnitude of the input signal below a predetermined minimum value will cause deenergization of the relay 51, thereby again reversing the heating relationships of the heaters 37 and 38. Thereafter, the "off" heater 37 will lower the resistance of the "off" resistor 27, and the cycle will be repeated. In each case, the cooling of the unheated resistor contributes to the establishment of resistance and temperature differentials between the resistors 27 and 28 in the same manner as does the heating of the heated resistor.

Accordingly, it can be seen from the above description that the conjoint operation of the heaters 37 and 38, resistors 27 and 28, relay 51, and amplifier 10 produces a cycling action of the apparatus which causes the relay 51 alternately to assume its energized and deenergized conditions. For the condition of no input signals to the amplifier 10 from the slidewire and reset bridges, the relay "on" time will be substantially equal to the relay "off" time, whereby the apparatus may be said to be operating at 50% "on" time, as assumed above. Under this condition, of course, heat will be supplied to the furnace at the maximum rate for 50% of each cycle of operation of the apparatus. Since the heaters 37 and 38 will then supply heat at equal average rates, the heating actions of these heaters will not effect the temperature equilibrium condition of the reset resistors 29 and 30, and no reset actions or effects will be produced as assumed above.

Cycle time control

The operation of the circuit including the cycle time control resistor 13 will now be described. If this circuit were omitted from the apparatus, the latter would cycle under the conditions described above at a rate determined by the thermal and electrical constants of the apparatus, and there would be no convenient means for controlling this rate of cycling. However, since it has been found desirable in many cases to be able to adjust the cycling rate or cycle time of such apparatus, the resistor 13 is advantageously employed in the present invention.

Specifically, the resistor 13 is connected in Fig. 2 between the movable relay contact 50 and ground, and hence to the conductor 47 and amplifier input terminal 46. The movable contact of the resistor 13 is connected through a resistor 80 to the other input terminal 41 of the amplifier 10. The contact of the resistor 13 is provided with a suitable knob 81 to permit the manual adjustment of the contact along the resistor 13.

From the connections just described, it can readily be seen that an adjustable portion of the voltage appearing between the relay contact 50 and the terminal 33 will be applied to the input of the amplifier 10, the magnitude of this portion being dependent upon the position of the contact on the resistor 13. Since the relay contact 50 is connected to the conductor 26 when the relay 51 is deenergized, and is connected to the conductor 25 when the relay 51 is energized, it is obvious that the signal between the contact 50 and the terminal 33 will be of supply voltage phase when the relay 51 is energized, and will be 180° out of phase with the supply voltage when the relay 51 is deenergized.

Remembering that the relay 51 is caused to be energized by the application of a suitable resultant input voltage of supply voltage phase to the amplifier 10, and considering the case in which the contact of the resistor 13 is at the top thereof, whereby a signal of maximum magnitude is supplied to the amplifier from the resistor 13, it will be seen that, when once energized, the relay 51 will tend to remain in this condition for an extended period of time, notwithstanding the tendency of the heated "on" resistor 28 and the cooling "off" resistor 27 to lower the magnitude of the amplifier input signal. In other words, the signal of supply voltage phase applied to the amplifier input from the relay contact 50 when the relay 51 is energized is of such a magnitude as to require the resistance of the "on" resistor 28 to decrease, and the resistance of the resistor 27 to increase, to much greater extents in order to deenergize the relay 51 than would be required if the signal from the contact 50 were not present. Since it requires a substantial amount of time for the resistors 27 and 28 to so change in resistance, the application of the signal from the relay contact 50 through the cycle time control connection materially slows down the cycling of the apparatus, or, in other words, increases the cycle time thereof. Accordingly, the uppermost position of the contact along the cycle time control resistor 13 of Fig. 2 produces operation of the apparatus with a maximum or slow cycle time.

Conversely, when the contact of resistor 13 is at the lower end thereof, no signal from the relay contact 50 is applied to the input of the amplifier 10. Under this condition, the apparatus operates as though the resistor 13 and its connections were entirely absent, and cycling occurs at the fastest possible rate.

Returning to the description of the operation of the apparatus under the conditions assumed above, and assuming that the cycle time control 13 is set for the fastest cycle time, the described equal "on"-"off" cycle periods may cause heat to be supplied to the furnace at the rate required to maintain the furnace temperature at the control point value. If this is the case, the apparatus will continue to operate as above discussed, and there will be no need for the reset effects or actions of the apparatus. Such operation will continue in the absence of furnace load or supply voltage changes or other occurrences which would have the effect of disturbing the equilibrium of the apparatus.

Figure 3:
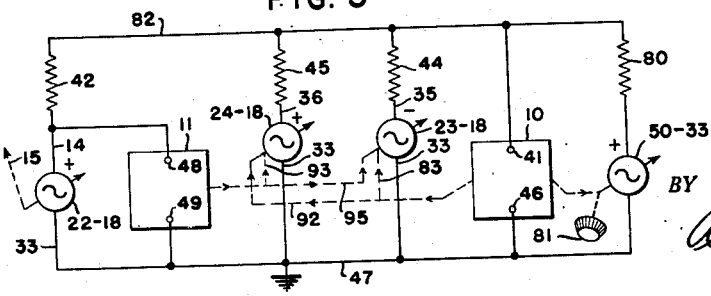
Fig. 3 is a simplified circuit diagram useful in describing the operation of the apparatus of Figs. 1 and 2.

The equivalent circuit of Fig. 3

The circuit of Fig. 3 is thought to be helpful in illustrating the manner in which the output signals from the various bridges cooperate and coact to control the amplifiers 10 and 11. In Fig. 3, each of the sources of signal voltage of Fig. 2 is shown diagrammatically as an adjustable alternating current generator or signal source capable of delivering alternating current signals of variable amplitude and of one phase or the opposite phase. As in Fig. 2, the amplifier 10 is controlled jointly by the output signals of the follow-up bridge 23—18, the reset bridge 24—18, the slidewire bridge 22—18, and the slow cycle time control circuit, while the reset amplifier 11 is controlled solely by the signal from the slidewire bridge. To this end, the source 22—18 of Fig. 3, representative of the output of the slidewire bridge which appears between the terminals 14 and 33, is shown connected directly between the input terminals 48 and 49 of the reset amplifier 11. The source 22—18 is shown as being controlled by the linkage 15 which in turn is positioned by the associated measuring instrument as illustrated in Fig. 1.

The source 22—18 of Fig. 3 is also connected in series with the resistor 42 between a conductor 82 and the grounded conductor 47. The conductor 82 is connected directly to the input terminal 41 of the amplifier 10, while the input terminal 46 of the latter is connected to the conductor 47 as in Fig. 2.

The voltage source 24—18, representative of the output of the reset bridge appearing between the terminals 36 and 33, is shown as being connected in series with the resistor 45 between the conductors 82 and 47. Similarly, the voltage source 23—18, representative of the output of the follow-up bridge appearing between the terminals 35 and 33, is shown as being connected in series with the resistor 44 between the conductors 82 and 47. Finally, the source 50—33, representative of the signal appearing between the relay contact 50 and the terminal 33, is shown as being connected in series with the resistor 80 between the conductors 82 and 47. Fig. 3 makes clearly apparent, therefore, that the four sources 22—18, 23—18, 24—18, and 50—33 are all connected in parallel across the input of the amplifier 10, each source having connected in series therewith its associated resistor.

Employing the circuit of Fig. 3 in summarizing the operation of the Fig. 2 apparatus as hereinbefore described, it can readily be seen that when the output from the slidewire source 22—18 is zero (controlled temperature at the control point value), there will be no signal applied to the input of amplifier 11, and the latter, therefore, will not cause the reset source 24—18 to supply any reset signals between the conductors 82 and 47 or between the input terminals 41 and 46 of the amplifier 10. Similarly, the source 22—18 will not produce any signal between the input terminals 41 and 46. Also, since it was assumed that the cycle time control 13 was set for maximum cycling rate, the source 50—33 will not produce a signal between the terminals 41 and 46.

However, as explained above, the cycling source 23—18 will supply a cycling signal between the amplifier terminals 41 and 46 which in turn will control the source 23—18 by means of the thermal connection 83. This connection is representative of the thermal relationship existing between the follow-up heaters 37 and 38 and the corresponding resistors 27 and 28 of Fig. 2.

As Fig. 3 makes readily apparent, therefore, the source 23—18 and the amplifier 10 will continue to cooperate to cycle the load on and off with a 50% "on" time as long as the resulting rate of application of heat to the furnace is that required to maintain the output of the source 22—18, and hence of the source 24—18, equal to zero. If it is desired to change the cycle time in order to lengthen the duration of the individual cycles, the source 50—33 may be adjusted by means of the knob 81 so as to apply to the amplifier 10 a signal of suitable magnitude to slow down the cycle time of the apparatus.

Continuing the description of the operation of the apparatus of the present invention, let it be assumed that a change in the furnace load occurs such that the rate of furnace heat input corresponding to 50% "on" time is insufficient to maintain the furnace temperature at the control point value. For the time being, the operation of the reset amplifier 11 and the fast reset action which it produces will not be considered nor described, in order that the slow reset action produced by the cooperation of the reset resistors 29 and 30 the follow-up heaters 37 and 38 can be illustrated and described to best advantage.

As a result of the load and measured furnace temperature changes which were mentioned immediately above, the contact 14 of Fig. 2 will be moved from the control point in an upward direction corresponding to a measured temperature decrease. This in turn will cause the slidewire bridge 22—18 to apply a signal of supply voltage phase to the input of the amplifier 10 which will have the effect of opposing the signal from the follow-up bridge tending to turn the load "off" and of increasing the ratio of the "on" time to the total time to some value other than unity. The relationship between these signals and their joint effect in controlling the amplifier 10 can readily be seen from the simplified showing of Fig. 3, wherein the various signals will be assumed to have the relative instantaneous polarities indicated.

Were there no reset actions whatsoever in the apparatus being discussed, the operation just described would continue until the measured furnace temperature started to increase in a direction to return to the control point value, whereby the signal from the slidewire bridge would commence to decrease. An equilibrium condition would later be established wherein the contact 14 would occupy a position displaced from the control point, and the furnace temperature would be maintained somewhat below the control point value, as necessary to cause the slidewire bridge to impress on the amplifier 10 a sufficiently large signal to maintain the percent "on" time high enough to cause the average rate of heat input to the furnace to be that necessary to maintain the last mentioned temperature. Such operation would be undesirable in most cases, however, since it would result in a furnace temperature "offset" or "droop," the furnace temperature being maintained at some value other than the intended control point value. Because of the presence of the reset bridge in the apparatus being discussed, however, the "droop" in the control temperature just described is prevented from occurring as will now be explained.

The slow reset action produced in the apparatus by the action of the follow-up heaters 37 and 38 on the reset resistors 29 and 30 will be described below in connection with Figs. 2, 3, and 4. The latter is a circuit diagram of the apparatus of Fig. 1 which is similar to the circuit diagram of Fig. 2 but illustrates the apparatus in somewhat more detail than does Fig. 2. Specifically, the circuit of Fig. 4 illustrates the manual control portion of the apparatus, to be described hereinafter, and also shows in more detail the thermal relationships existing between the various heaters and resistors of the follow-up and reset bridges of Fig. 2. In each figure, the same component is designated by the same reference character.

*Description of the Fig. 4 apparatus*

As shown in Fig. 4, the "off" follow-up heater 37, the "off" follow-up resistor 27, the "off" reset resistor 30, the "off" reset heater 40, and the high thermal capacitance device 32, associated with the resistor 30 and heater 40, are contained within an "off" thermal unit 84, while the "on" follow-up heater 38, the "on" follow-up resistor 28, the "on" reset resistor 29, the "on" reset heater 39, and the thermal device 31, associated with the resistor 29 and heater 39, are contained in an "on" thermal unit 85. As shown by the double headed arrows in Figs. 2 and 4, and as will be explained hereinafter, there is heat coupling between the heater 37 and the resistor 30 as well as the resistor 27, and between the heater 40 and the resistor 27 as well as the resistor 30. Additionally, there is heat coupling between the resistors 27 and 30 themselves. However, the heat coupling between the follow-up elements 27 and 37 at the left-hand end of the unit 84 and the reset elements 39 and 40 at the right-hand end of the unit 84 is a low conductance coupling, whereas the coupling between the follow-up elements 27 and 37 themselves is a high conductance coupling, as is the coupling between the reset elements 30 and 40.

Similarly, there is heat coupling between the heater 38 and the resistor 29 as well as the resistor 28, as there is between the heater 39 and the resistor 28 as well as the resistor 29. In this case also there is heat coupling directly between the resistors 28 and 29. As is the thermal unit 84, however, the heat coupling between the follow-up elements 28 and 38 at the left-hand end of the unit 85 and the reset units 29 and 39 at the right-hand end of the unit 85 is a low conductance coupling, while a high conductance coupling exists between the follow-up elements 28 and 38 themselves, and between the reset elements 29 and 39 themselves.

In each of the units 84 and 85, the respective devices 32 and 31 of high thermal capacitance cause the temperatures of the respective reset resistors 30 and 29 and the respective reset heaters 40 and 39 to change more slowly than do the temperatures of the follow-up resistors and heaters at the left-hand ends of the units 84 and 85 in Fig. 4.

In Fig. 4, the relay 51, shown separate from the amplifier 10 in Fig. 2, is assumed to be contained within the block representing the amplifier 10. Accordingly, the amplifier 10 in Fig. 4 is connected by conductors 86, 87, and 88 to the follow-up heaters 37 and 38 which, in Fig. 2, are shown directly connected to the contacts of the relay 51. Specifically, the amplifier 10 of Fig. 4 is provided with heater energizing terminals 89, 90, and 91 which are assumed to be connected within the amplifier to the respective contacts 52, 50, and 53 of the relay 51. The conductor 86 connects the amplifier terminal 89 to the terminal of the heater 37 which is connected to the conductor 25, while the conductor 87 connects the amplifier terminal 90 to the junction between the heaters 37 and 38. Finally, the conductor 88 connects the amplifier terminal 91 to the terminal of the heater 38 which is also connected to the conductor 26. In Fig. 4 as in Fig. 2, therefore, the heater 37 has connected thereacross the normally open relay contacts 50—52, while the heater 38 has connected thereacross the normally closed relay contacts 50—53.

Slow reset action

As was stated hereinbefore, the action of the apparatus, in the presence of a load or analogous change which causes upward movement of the instrument slidewire contact 14 from the control point in response to a temperature decrease, is to apply to the amplifier 10 an appropriate input signal which increases the "on" time to total time ratio of the operation of the relay 51. This results in an increase in the rate of average heat input to the furnace 1, as previously noted. In addition to effecting the follow-up action described above, the resulting unequal average heating of the heaters 37 and 38 and resistors 27 and 28 will quickly subject the reset resistors 29 and 30 to an unequal average heating effect, and will gradually cause the resistor 29 to assume a higher temperature than that possessed by the resistor 30. This temperature differential will occur even though the reset heaters 39 and 40 are equally energized, as it is assumed they are in order to simplify the present description by neglecting the fast reset action produced in the apparatus.

As a result of the very gradual increase in temperature of the reset resistor 29 relative to that of the resistor 30 produced by the increased percentage "on" time of the follow-up heater 38, the resistance of the resistor 29 will slowly decrease with respect to the resistance of the resistor 30, these actions constituting the slow reset action and taking place slowly because of the thermal inertia supplied by the device 31. The relative change in the resistances of the resistors 29 and 30 will also be augmented by the reduced average heating of the "off" cycling heater 37 and the consequent gradual reduction in temperature and increase in resistance of the reset resistor 30.

The occurrence of a resistance differential between the reset resistors 29 and 30 will obviously result in the production of an output signal by the reset bridge 24—18, and hence in the establishment of a reset effect. Since the assumed operation results in a decrease in the resistance of the resistor 29 and an increase in the resistance of the resistor 30, the resulting increase in the potential between the terminals 36 and 33 will be such as to cause the production of an output signal of supply voltage phase. Consequently, this signal will augment the slidewire bridge output signal, and will oppose the follow-up bridge output signal.

The above signal relationships can be clearly seen from Fig. 3, wherein it is shown that the assumed heating effect produced by the amplifier 10 will cause the reset source 24—18 to produce a signal having an instantaneous polarity or phase which is the same as that of the signal from the slidewire source 22—18, but which is opposite to the output of the follow-up source 23—18. In Fig. 3, the heat coupling 83 is the follow-up coupling between the heaters 37 and 38 and the respective resistors 27 and 28, while the heat coupling between the heaters 37 and 38 and the respective reset resistors 39 and 29 is designated in Fig. 3 at 92, wherein it is shown connecting the amplifier 10 for control of the reset source 24—18.

Since the signal produced by the reset bridge is opposite in phase to the follow-up signal but is of the same phase as the output signal of the slidewire bridge, the first mentioned signal acts on the amplifier 10, in the same manner as does the slidewire signal, to increase to an even greater extent the "on" time to total time ratio of the operation of the relay 51. Accordingly, the operation of the reset bridge under the influence of the follow-up heaters augments the effects of the upward displacement of the contact 14 and causes an additional increase to occur in the rate of heat input to the furnace 1. Further, because of the thermal inertia associated with the reset resistors 29 and 30, the effects of the reset bridge output signal are not felt at the instant of displacement of the contact 14 from the control point, but instead become gradually apparent following such displacement.

Continuing the description of the assumed operation of the apparatus of the present invention, let it next be assumed that the effect of the increased rate of furnace heat input is to cause the contact 14 to start moving back toward the control point. As the contact 14 so moves, the output from the slidewire bridge will decrease toward zero, which would cause a reduction in the newly acquired higher percent "on" time if it were not for the presence of the above described reset bridge signal. The latter, however, will still be increasing in magnitude even though the slidewire bridge signal will be decreasing, with the result that the percent "on" time will not be reduced, but will instead be kept at the new, higher value. As the slidewire contact 14 subsequently closely approaches the control point under the influence of the increased rate of furnace heat input, the output from the reset bridge will start to level out at some average value other than zero, and an equilibrium condition will finally be reached wherein the average reset and follow-up bridge output signals will be of equal magnitude, but of opposite phase, and wherein the contact 14 will have returned to the control point and reduced the output of the slidewire bridge to zero. Since the resistors 44 and 45 are advantageously made to have the same resistance values, the above condition will cause the average input to the amplifier 10 to be zero, whereby the apparatus will proceed to cycle with a percent "on" time as necessary to maintain zero average input to the amplifier 10. This percent "on" time will automatically be that required to maintain the furnace temperature substantially at the control point value, since any departure from the latter will cause a movement of the contact 14 and the production of a slidewire bridge output signal which in turn will upset the equilibrium condition and cause the establishment of a new operating point at which the ratio of the apparatus "on" time to total time will be maintained at the value required to hold the furnace temperature at the desired value.

Since the action of the amplifier 10 and the follow-up heaters on the reset resistors in establishing the reset effect above described requires an appreciable amount of time from the occurrence of a change in the percent "on" time, we have chosen to refer to these effects as slow reset effects as previously noted. It should also be clear from the above description that the slow reset effect is an extended or continued one, the necessary amount of reset effect being maintained in the apparatus by the continued unequal average energization of the follow-up heaters, even though the contact 14 returns to and is held at the control point.

*Fast reset action*

In connection with the need for a fast reset action in apparatus of the type being discussed, it should be noted that the slow reset effects and actions just described are not sufficient in some cases to maintain the measured temperature at the control point value with the required degree of accuracy or stability. Thus, as was noted above, the slow reset effects do not manifest themselves significantly until an appreciable time after the measured temperature has shifted from the control point value and changed the percent "on" time by a follow-up action. In other words, the slow reset action permits the controlled temperature to vary substantially from the control point value for an appreciable length of time before bringing the apparatus back into equilibrium at a new rate of fuel supply. Since such temperature excursions are undesirable or even intolerable in some applications, reset action is needed which is capable of faster operation than that supplied by the slow reset arrangement.

As was mentioned hereinbefore, the reset amplifier 11 receives an input signal from the slidewire bridge 22—18 immediately upon a departure of the controlled temperature from the desired value. Accordingly, upon such temperature deviation, the amplifier 11 is instantaneously operative to effect a change in the relative energizations of the reset heaters 39 and 40 from the equal energization condition which exists when the contact 14 is at the control point. Assuming, as above, that the apparatus has been in a state of equilibrium for an appreciable time without the need for any reset, it will be considered that the reset and slidewire bridge outputs are zero at the instant at which the controlled temperature starts to decrease due, for example, to a sudden furnace load increase or analogous change. Upon such occurrence, the follow-up bridge and amplifier 10 will cooperate as before to effect a follow-up control action and increase the percent "on" time by an amount commensurate with the amount of temperature decrease. At the same time, the reset amplifier 11 will cause the reset heater 39 to be energized to a greater extent than the heater 40, the magnitude of the differential energization being commensurate with the magnitude of the temperature decrease and the corresponding amount of displacement of the contact 14 from the control point.

The unequal energization of the reset heaters 39 and 40 has the same effect of causing the reset bridge to produce an output signal of supply voltage phase as does the average unequal energization of the follow-up heaters 38 and 37 described above in connection with the slow reset action. However, the production of the reset bridge output signal is effected much more rapidly by the reset heaters 39 and 40 than it is by the follow-up heaters 38 and 37 because of the reset resistors 29 and 30 being in better heat transfer relationship with the respective reset heaters 39 and 40 than they are with the respective follow-up heaters 38 and 37. In other words, the heat or thermal coupling between the reset heaters and the respective reset resistors has a higher conduction than the heat coupling between the follow-up heaters and the respective reset resistors. Accordingly, the reset bridge produces under the action of the amplifier 11 and heaters 39 and 40 a reset signal which is of the same character as that described above in connection with the slow reset action but which is produced and becomes effective much more quickly than does the slow reset signal. Therefore, the fast reset signal is operative to perform its function of increasing the apparatus percent "on" time before the controlled temperature has had the opportunity to depart very far from the control point value.

In Fig. 3, the heat coupling between the reset amplifier 11 and the reset source 24—18 has been designated by the reference character 93. As Fig. 3 makes clearly apparent, the action of the amplifier 11 on the reset source 24—18 through the heat coupling 93 is of the same nature as the action of the amplifier 10 on that source through the heat coupling 92. In each case, the signal produced by the reset source 24—18 is of the same phase of instantaneous polarity as the output of the slidewire source 22—18, and hence augments the last mentioned signal in its effect of increasing the rate of heat input upon the assumed occurrence of a controlled temperature decrease.

As was mentioned above, the relatively rapid appearance of the fast reset output signal effects appropriate increases in the rate of furnace heat input before the measured temperature has normally had time to depart to any great extent from the control point value. This means that a corrective action is applied by the fast reset action at a time so soon after the initial temperature drop as to prevent any substantial temperature excursion below the desired control point value. The extra increase in heat input rate, produced by the reset effects quickly established by the fast reset action, above the heat input increase effected directly by the displacement of the contact 14 acts to minimize the amount of displacement of this contact, and hence the amount of temperature deviation which can occur before the increased heat input rate takes effect and returns the controlled temperature to the desired value.

In the above description of the fast reset action of the present invention, this action has been spoken of as occurring at its maximum rate. However, it has been found desirable under some operating conditions to operate the apparatus with a reset rate which is somewhat less than the maximum obtainable but which is greater than the minimum reset rate provided by the slow reset action. In order to obtain intermediate values of reset rate in the present apparatus, the resistor 12 of the reset amplifier 11 may be adjusted manually by means of the knob 78, as previously mentioned. The connections of the resistor 12 to the other components of amplifier 11 will be described hereinafter in connection with Fig. 5.

To return to the description of the assumed operation of the present apparatus, it was explained above that the fast reset signal produced by the reset bridge 24—18 quickly causes an additional increase in the rate of furnace heat input in order to hold the temperature deviation to a minimum. Under normal conditions, therefore, the additional corrective effect of the fast reset signal will quickly cause the controlled temperature to stop decreasing and to return toward the desired value. Even as the contact 14 closely approaches the control point, and thereby decreases the slidewire bridge output and reset amplifier input signals towards zero, the thermal inertia of the reset bridge will cause the percent "on" time of the apparatus to be kept at a sufficiently high value to maintain the desired furnace temperature. When the contact 14 has returned exactly to the control point, of course, the input to the reset amplifier 11 will be zero, whereby equal energization of the reset heaters 39 and 40 will once again prevail. When this occurs, the effects of these heaters in producing a reset action will diminish, but by that time the effects of unequal average energization of the follow-up heaters on the respective reset resistors will have increased sufficiently to supplant the diminishing effects of the reset heaters. Accordingly, the follow-up heaters 37 and 38 will gradually take over the control of the temperature of the respective reset resistors 39 and 29 as the respective reset heaters 40 and 39 relinquish their differential temperature control of the reset resistors. As explained hereinbefore, an equilibrium condition will finally be established wherein the controlled temperature will be at the control point value, the contact 14 will be at the control point, the slidewire bridge output and reset amplifier input signals will be zero, and the follow-up bridge and reset bridge output signals will cooperate to provide an average input of zero to the amplifier 10 so that the latter will maintain the proper "on" time to total time ratio of the operation of the apparatus.

In connection with an explanation of the operation of the follow-up heaters in maintaining the necessary amount of reset effect in the apparatus after the contact 14 and controlled temperature have returned to the control point, at which time all reset actions have been terminated by the reestablishment of equal energization of the reset heaters and by the establishment of a desired percent "on" time and a constant average energization differential for the follow-up heaters, it has been found to be helpful to consider the heat flows and heat losses involved. Thus, starting from an assumed condition of equal energization of the reset heaters, equal average energization of the follow-up heaters, and equal temperatures for the reset resistors and units 84 and 85 (no reset effect present in the apparatus), it will be apparent that a controlled temperature decrease from the control point value will cause heat to flow from the "on" reset heater 39 and from the "on" follow-up heater 38 to the "on" reset resistor 29 and device 31. This will occur due to the average energization of the heaters 38 and 39 being raised above the values corresponding to the equilibrium temperatures of the units.

Heat will flow at a faster rate to the resistor 29 from the heater 39 than it will from the heater 38, however, due to the higher conductance of the heat coupling between the elements 29 and 39 than between the elements 38 and 29. Accordingly, the resistor 29 will have its temperature raised at a relatively rapid rate by the heat flow from the heater 39, this being the fast reset action, while the lower rate of heat flow from the heater 38 will at most contribute only a small portion of the heat required to raise the temperature of the resistor 29, assuming that the fast reset action is set to operate at a high rate. At this time, therefore, the slow reset action may contribute little to the establishment of the reset effect. The latter will appear somewhat gradually in any event because of the thermal inertia of the device 31. The heating action will continue until temperature equilibrium is reached within the device 85, with the latter at a new, higher temperature corresponding to the increased energization of the heaters 38 and 39.

The above described establishment of a reset effect is augmented by the cooling of the heaters 37 and 40 which results from the decreased energization thereof accompanying the increased energization of the heaters 38 and 39. This cooling action, and the accompanying cooling of the resistor 30 and device 32, are accompanied by heat flow from the device 84, since the temperature of the latter must be reduced to a new, lower value commensurate with the decreased energization of the heaters 37 and 40 before equilibrium can be attained.

If it is now assumed that the increased rate of furnace heat input provided by the above actions is that required to cause the controlled temperature to be returned to and held at the control point value, the apparatus energizations and temperatures will level out at appropriate equilibrium values, with the "on" unit 85 at a higher temperature than the "off" unit 84, due to the unequal follow-up heater average energizations required to maintain the new, higher percent "on" time and heat input rate. Under this equilibrium condition, there will be just sufficient average heat flow from the follow-up heaters 37 and 38 to maintain their respective units 84 and 85 at the equilibrium temperature values in the face of heat losses from the units, the accompanying equal energization of the reset heaters 39 and 40 not contributing to the maintenance of the necessary temperature difference between the units 84 and 85.

Since the temperatures of the reset resistors 29 and 30 will be those of their respective units 85 and 84, there will be no heat flow required to or from these resistors in order to maintain the necessary amount of reset effect in the apparatus. Accordingly, this reset effect will continue to permit operation at the increased percent "on" time even though the signals from the slidewire bridge to the amplifiers 10 and 11 have disappeared.

Such operation could not be achieved without the illustrated thermal relationships, however, since the reset heaters 39 and 40 alone could not cause the necessary reset effect to be maintained in the apparatus after the controlled temperature had returned to the control point value. Specifically, if the reset heaters and corresponding reset resistors were thermally separate from the follow-up heaters and associated components, no reset effect could be maintained in the apparatus when at the control point, since the equal energization of the reset heaters could not maintain the necessary temperature difference between the resistors 29 and 30 in the face of the inherent heat losses which would be encountered.

It is clear from the above, therefore, that the inclusion of the reset elements in the same units as the corresponding follow-up elements provides means for maintaining the required amount of reset effect in the apparatus, no matter whether obtained by the fast or the slow reset action, and also provides means for effecting the slow reset action itself, which action is capable of establishing a required reset effect in the apparatus even in the total absence of the fast reset action. This latter is significant when it is noted that the slow reset action will so operate even upon operative failure of the reset amplifier and/or the reset heaters.

It will be obvious, of course, that controlled temperature departures in the opposite direction to that considered above will effect the necessary reduction in the average rate of furnace heat input as required to return the controlled temperature value to the control point. Naturally, controlled temperature departures of different magnitudes and occurring at different rates in various processes possessing different lags will produce follow-up and reset effects which occur at appropriate times and rates which may differ somewhat from those described above by way of example. However, by the proper adjustment of the various controls provided in the present apparatus, the latter is capable of proper adjustment so as to effect the desired control of practically any process or arrangement, notwithstanding the fact that different arrangements may possess widely different characteristics and require, therefore, widely different controlling actions.

Rate action

In addition to the above described cycling, slow reset, and fast reset functions of the apparatus of the present invention, the latter also advantageously provides a so-called rate action function, whereby the magnitude of deviations in the controlled temperature are further suppressed. The rate action of the present apparatus functions to cause a given change in the controlled temperature to effect a corrective action, the magnitude of which is a function of the rate of the temperature change as well as of the magnitude thereof. For example, a given decrease in the controlled temperature below the control point value is made to effect a larger increase in the percent "on" time of the apparatus when the temperature drop occurs at a given rate than would be effected if the same temperature drop occurred at a slower rate. Considering the rate action from another angle, it may be said that this action causes a given temperature deviation to provide an initial additional corrective action of a given magnitude which subsequently drops off to zero, leaving the value of input signal which the apparatus would have provided in the first place if the rate action had not been present.

The rate action occurring in the apparatus of the present invention is produced by thermal time lags associated with the follow-up mechanism. This can best be described by reference to an assumed operating condition wherein, for example, a temperature decrease occurs at a time prior to which the controlled temperature has been at the control point value for an appreciable length of time with no reset action having been necessary. As was explained hereinbefore under the same assumptions, the departure of the controlled temperature from the control point value immediately causes the application of a signal to the amplifier 10 from the slidewire bridge 22—19, which signal is effective to increase the percent "on" time of the apparatus by causing the average energization of the "on" follow-up heater 38 to be greater than the average energization of the "off" follow-up heater 37. However, the "on" follow-up resistor 28 cannot immediately assume the new, higher temperature to which the heater 38 is attempting to bring it, since there are certain thermal time lags which must first be overcome. The first of these lags is due to the thermal inertia of the resistor 28 and heater 38 themselves, which inertia must be overcome before the increased energization of the heater 38 can effect an increase in the temperature of the resistor and heater to a new, higher value.

The second effect which retards the heating of the resistor 28 is that produced by the shell or container for the "on" unit 85. This shell, designated by the reference character 93 in Fig. 4, contributes a certain amount of thermal inertia to the unit, which means that some time is required for the increased energization of the heater 38 to raise the temperature of the shell. However, the resistor 28 cannot come up to the new temperature until the shell temperature has been brought up to the new value. A second metallic shell surrounding the unit 85 and described below in connection with Fig. 6 also retards the heating of the resistor 28.

Finally, the thermal device 31 must have its temperature increased by the heater 38 before the resistor 28 can have its temperature brought up to that of the heater 38. This effect is produced by the heat coupling between the follow-up elements 28 and 38 at the left-hand of the unit 85, and the reset elements 31, 29, and 39 at the right-hand end of the unit. Since the thermal inertia of the device 31 is substantial, an appreciable amount of time is required for the last mentioned action to be achieved. Accordingly, the time required to bring the resistor 28 up to the temperature of the heater 38 is increased by this effect also.

In addition to the heating lags associated with the resistor 28 by the various effects just described, there is in addition a cooling lag associated with the "off" follow-up resistor 27. The decreased average energization of the heater 37 will cause the temperature thereof and of the resistor 27 to start to decrease below the equilibrium value, but this action will be retarded by several effects which are analagous to the effects which retarded the heating of the resistor 28. The first effect which retards the cooling of the resistor 27 and heater 37 is that produced by the thermal inertias of the resistor and heater themselves. These inertias prevent the immediate cooling of the resistor 27 and heater 37 to the new, lower temperature commensurate with the decreased energization of the heater 37.

The second cooling retarding action on the resistor 27 is that produced by the shell of the "off" unit 84, which shell has been designated by the reference character 94 in Fig. 4. The shell 94 will have been at some equilibrium temperature while the apparatus was in equilibrium, and will have to have its temperature reduced to the new, lower value before the resistor 27 can assume its new, lower temperature. A second metallic shell surrounding the unit 84 and described below in connection with Fig. 6 also retards the cooling of the resistor 27.

Finally, the device 32 must be cooled from its equilibrium temperature before the temperature of the resistor 27 can be effectively decreased to the lower value, this effect being produced by the heat coupling between the left-hand follow-up elements 27 and 37 and the right-hand reset elements 32, 30, and 40 of the unit 84. The high thermal capacity of the device 32 substantially delays the cooling of the resistor 27.

Summarizing the above, a combination of the heating retarding and cooling retarding effects produced on the respective "on" and "off" follow-up resistors 28 and 27 gives rise to a rate action effect in the apparatus, since these thermal time lags or delays delay the normal action of the follow-up mechanism and hence delay the production of the opposing follow-up bridge output signal, whereby the slidewire bridge output signal is permitted to effect a greater initial increase in the percent "on" time than would be effected if the follow-up bridge could act immediately to oppose the slidewire bridge signal. Accordingly, the greater the rate of temperature deviation, the greater the magnitude of this effect, whereby the term rate action is seen to be properly applied to the phenomena just described.

In connection with the rate action as described above, it may be well to note that the reset heaters 39 and 40 may, for very fast reset rates, produce a slight decrease in the magnitude of the rate action obtainable. For example, under the assumed conditions above discussed, the increased heating of the reset resistor 39 in the presence of the temperature decrease may reduce somewhat the time required for the device 31, and hence the resistor 28, to arrive at the new, higher temperature values. This heat coupling between the reset heater and the follow-up resistors is designated in Fig. 3 by the reference character 95. This reduction in obtainable rate action, however, is not excessive, and still permits the attainment of sufficient rate action in the apparatus, even in the presence of the fastest reset rate available.

To summarize the signal and control relationships between the various amplifiers and bridges of the apparatus as described in detail above, reference to Fig. 3 clearly shows that the slidewire signal 22—18 is aided in controlling the amplifier 10 by the reset signal 24—18, and is opposed by the follow-up signal 23—18. The follow-up signal 23—18 is controlled by the amplifier 10 through the follow-up heat coupling 83. Similarly, the reset signal 24—18 is controlled by the reset amplifier 11 through the fast reset heat coupling 93, while this amplifier in turn is directly controlled solely by the slidewire signal 22—18. In addition, the reset signal 24—18 is increased by the slow reset heat coupling 92 from the amplifier 10. Finally, the cycle time signal 50—33 opposes the follow-up signal 23—18 in the control of the amplifier 10, and thereby increases the cycle time thereof.

As noted above, the resistance values of the resistors 44 and 45 are advantageously made to be equal, while the values of the resistors 42 and 80 are chosen according to the voltages supplied by their associated sources in order that the desired resultant voltages will be applied to the amplifier 10.

Proportional band adjustment

As was previously mentioned, the apparatus of the present invention includes a resistor 43, shown in Figs. 2 and 4, connected between the contact 14 and the remainder of the apparatus. The purpose of this resistor is to provide a manual adjustment of the proportional band of the apparatus. Since the subject of proportional band control is one which is well-known in the art, it appears sufficient to state herein that the adjustment of the resistor 43 determines the required magnitude of the deviation of the controlled temperature in either direction from the control point value to cause the apparatus to operate at either maximum or minimum percent "on" time, depending upon whether the temperature deviation is a decrease or an increase relative to the control point value. Specifically, the magnitude of a temperature decrease which will cause the apparatus to operate with a maximum ratio of controller "on" time to total time is determined by the adjustment of the proportional band resistor 43. In other words, the magnitude of the controlled temperature decrease or increase which will cause heat to be supplied to the furnace 1 at the maximum or minimum rates, respectively, is a function of the setting of the resistor 43.

As shown in Figs. 2 and 4, the resistor 43 effects its proportional band width control by being connected in series between the instrument slidewire contact 14 and the inputs to the amplifiers 10 and 11. Specifically, the resistor 43 is connected between the contact 14 and the junction between the conductors connected to the input terminal 48 of the amplifier 11 and the terminal of the resistor 42 which is not connected to the amplifier 10. The resistor 43 includes a movable shunting contact 96 which is advantageously provided with a knob 97 for manual adjustment purposes. Rotation of the knob 97, therefore, adjusts the width of the proportional band of the apparatus.

It has been noted under certain operating conditions of the present apparatus that the proportional band width thereof varies somewhat in the presence of changes in the magnitude of the energizing voltage supplied by the conductors 16 and 17, due to the resulting changes in the heating power supplied to the follow-up heaters 37 and 38. In order to minimize this effect in instances where its presence is undesirable, we have found it feasible to form the follow-up heaters 37 and 38 of nickel wire, the positive temperature coefficient of resistance thereof serving to minimize changes in heater energizing power due to supply voltage changes. By this means, the resistances of the heaters 37 and 38 will vary with the temperatures thereof, whereby supply voltage changes will change both the heater voltages and the heater resistances in the proper manner to cause one effect to compensate substantially for the other, and hence will not result in significant heater energizing power changes or resulting variations in proportional band width. Any resulting undesirable sensitivity of the heaters to ambient temperature changes can be rendered unobjectionable by proper selection of the resistance values of the resistors 42, 44, and 45 as necessary to cause the temperature sensitivity of the follow-up resistors 27 and 28 to compensate for that of the heaters 37 and 38 in the presence of ambient temperature changes.

*Safe failure resistor*

Also advantageously included in the apparatus, and illustrated in Figs. 2 and 4, is a safe failure resistor 97', which resistor functions to cause the relay 51 to be deenergized, and the controlled load to assume the "off" condition, upon the occurrence of an interruption in the continuity of the circuit between the slidewire 8 and the components connected thereto by the contact 14. Such an interruption might be caused by dirt interposed between the contact 14 and the resistor 8, by breakage of the lead connected to the contact 14, etc.

As shown, the resistor 97' is connected between the conductor 26 and the junction between the resistor 43 and the conductor connected to the contact 14. Accordingly, upon interruption of the circuit between the contact 14 and the resistor 8, the resistor 43 is essentially connected through the resistor 97' to the conductor 26, whereby signals are applied to the amplifiers 10 and 11 of the same character as would be applied thereto by the normal downward movement of the contact 14 in the presence of a sudden furnace temperature increase of large magnitude. Since such a temperature increase would normally cause a quick reduction in the average furnace heat input rate to its minimum value, such an action occurs also, upon failure of the slidewire circuit as just described, through the medium of the resistor 97'.

*Manual control*

Before concluding the description of the arrangement disclosed in Fig. 4, a description of the manual control provisions of the apparatus will be given. These manual control provisions permit the quantity controlled by the apparatus, the temperature of the furnace 1, for example, to be controlled manually rather than automatically when conditions arise to make such a change in control feasible.

For manual control purposes, the apparatus of Fig. 4 includes a manual slidewire resistor 98 provided with a movable contact 99 and an associated adjusting knob 100. The slidewire 98 is connected between the conductors 25 and 26 in series with resistors 101 and 102. The resistor 101 is connected between the upper end of the slidewire 98 and the conductor 25, while the resistor 102 is connected between the lower end of the slidewire 98 and the conductor 26. The contact 99 is connected in series with a resistor 103 to a "manual" contact 104 of a "manual-automatic" switch. The latter consists of two ganged portions, one of which is shown at 105 in Fig. 4 and the other of which is shown at 106 in Fig. 5 and will be described hereinafter.

The switch portion 105 also includes an "automatic" contact 107 and a movable contact 108. The latter is connected to the input terminal 41 of the amplifier 10 and engages the contact 107 when the switch is in the "automatic" position. The contact 107 is connected to the junction between the resistors 42 and 45, whereby the connections shown in Fig. 2 are completed by the switch portion 105 when the latter is in the "automatic" position.

If it is desired to operate the apparatus under manual control, whereby the temperature of the furnace 1 can be manually adjusted and the automatic control of the furnace temperature can be rendered ineffective, the switch portion 105 is moved to the "manual" position, in which the contact 108 engages the contact 104. This action connects the manual slidewire 98 to the input of the amplifier 10 in lieu of the instrument slidewire 8, and disconnects from the input of the amplifier 10 the output of the reset bridge. Under this condition of operation, the position of the contact 99 along the slidewire 98 will determine the percent "on" time of the apparatus, and hence the average rate of heat input to the furnace 1. The follow-up bridge 23—18 will be operative as for automatic control, as will the cycle time control resistor 96. However, the reset bridge, the reset amplifier 11, the proportional band control 43, and the instrument slidewire 8 will have no effect upon the operation of the apparatus or on the rate of furnace heat input or furnace temperature.

Although the output of the reset bridge is disconnected from the input of the amplifier 10 when the apparatus is under manual control as described immediately above, whereby the reset means then exert no effect on the rate of furnace heat input, the reset resistors 29 and 30 will, nevertheless, continue to be heated differentially by the follow-up heaters 37 and 38 in the manner previously described in connection with the slow reset aspects of the apparatus. Accordingly, an appropriate slow reset signal is produced between the terminals 32 and 33 even under manual control operating conditions, though this signal is not then utilized, as noted above.

However, when the apparatus is subsequently returned to the automatic control condition by the manipulation of the switch 105, the reset signal, which has already been established as just noted, is operative to apply its reset effect to the apparatus at once, no time being required for the signal and effect to be established. Therefore, if the apparatus has been adjusted in the manual control condition to be controlling at the control point prior to the act of switching to automatic control, as will usually be the case under normal procedure, the requisite amount of reset effect will be instantly available in the apparatus at the time of switching, and the transfer from manual to automatic control will be effected with a minimum of disturbance to the control of the process.

As will be explained hereinafter in connection with a detailed description of the reset amplifier 11, the fast reset action is prevented from contributing to the production of the reset signal while the apparatus is in the manual control condition. To this end, the reset heaters 39 and 40 are at that time prevented from differentially heating the reset resistors 29 and 30, whereby the reset signal then produced by these resistors is due solely to the slow heating action of the follow-up heaters, and hence is limited in magnitude to that which will just be required to maintain the necessary percent "on" time when return is made to the automatic control condition. Consequently, an excessive amount of potential reset effect is prevented from accumulating while the apparatus is under manual control, but the necessary amount of such effect is ready to function when needed.

Figure 5:
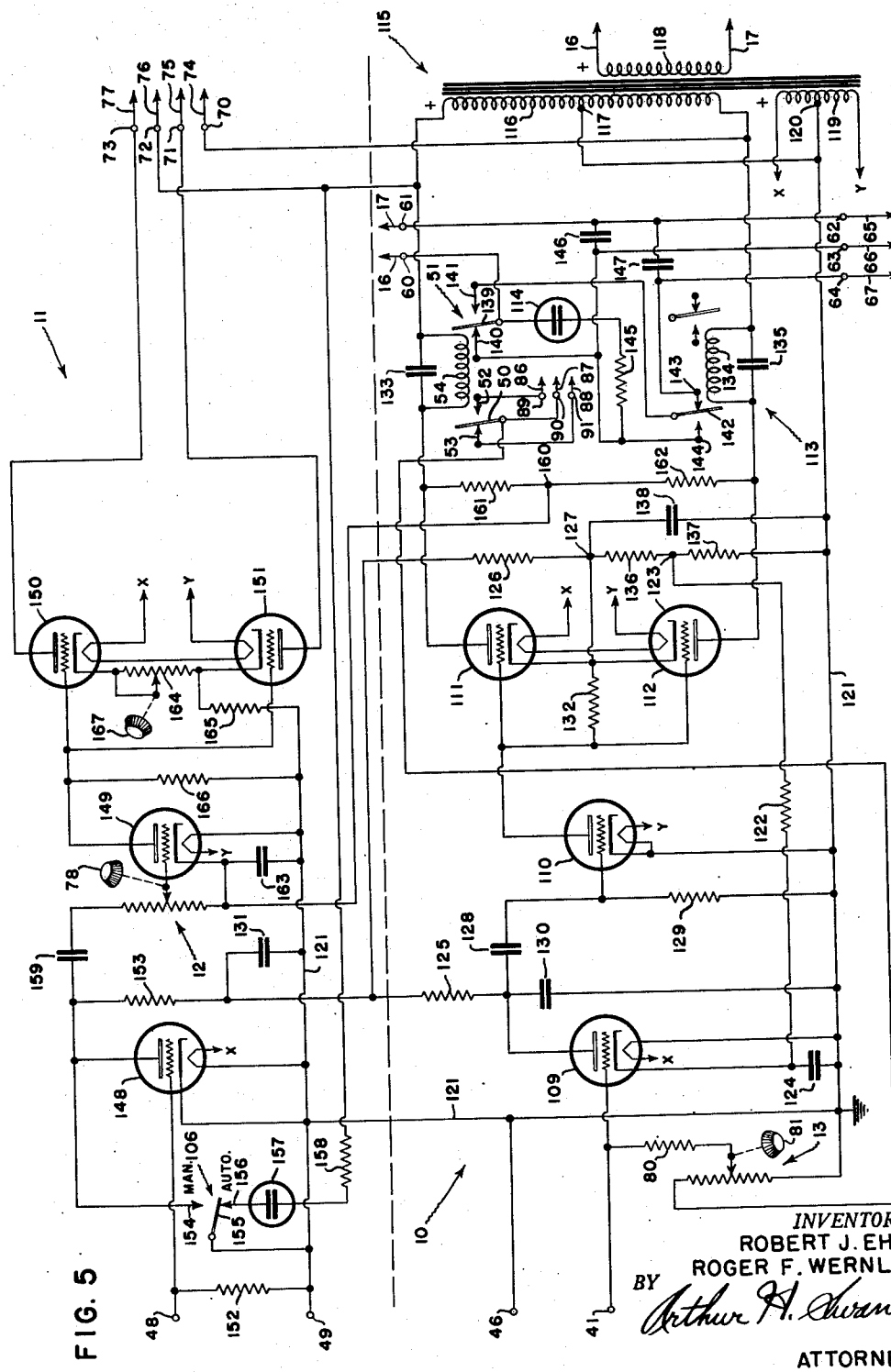
Fig. 5 is a circuit diagram illustrating in detail the amplifiers of Fig. 4.

The control amplifier of Fig. 5

We have illustrated in Fig. 5 the detailed circuit connections of preferred forms of the cycling control amplifier 10 and the reset amplifier 11 for use with the apparatus illustrated in Figs. 1 through 4. As shown in Fig. 5, the amplifier 10 includes a first amplifying stage triode electron tube 109, a second amplifying stage triode electron tube 110, and power amplifying triode electron tubes 111 and 112. Each of the tubes 109 through 112 includes anode, control grid, cathode, and cathode heater elements in the usual manner. Also included in the amplifier 10 are the control relay 51, a safe-failure relay 113, a neon signal lamp 114, a power transformer 115, and various other circuit components to be described.

As shown, the transformer 115 includes a secondary winding 116, provided with a center-tap connection 117, and a primary winding 118 which is connected between the aforementioned energizing or supply voltage conductors 16 and 17. The transformer 115 also includes a low voltage secondary winding 119 which supplies heater energizing current to the tubes 109, 110, 111, and 112 through partially shown conductors X and Y. The winding 119 is provided with a center-tap connection 120 which, together with the connection 117, is connected to a ground bus or grounded conductor 121.

The specific connections through which the transformer secondary winding 119 energizes the heaters of the tubes 109 through 112 are important from the safe-failure standpoint, as will be brought out hereinafter. Accordingly, these connections will now be described with reference to Fig. 5, wherein each of the tubes 109 and 110 is seen to have its heater connected across a respective half of the winding 119, while the heaters of the tubes 111 and 112 are connected in series across the entire winding 119.

Specifically, one terminal of the heater of the tube 109 is connected by the conductor X to the upper end terminal of the winding 119, while the other terminal of the last mentioned heater is connected by the conductor 121 to the center-tap 120 of the winding 119. Similarly, one terminal of the heater of the tube 110 is connected by the conductor Y to the lower end terminal of the winding 119, while the other terminal of the last mentioned heater is connected by the conductor 121 to the center-tap 120 of the winding 119. Accordingly, the heater of the tube 109 is connected across the upper half of the winding 119, while the heater of the tube 110 is connected across the lower half thereof.

The series connection of the heaters of the tubes 111 and 112 across the winding 119 is achieved by connecting together one terminal of each of the last mentioned heaters, and by connecting the remaining terminal of the heater of the tube 111 to the upper end terminal of the winding 119 through the conductor X. Finally, the remaining terminal of the heater of the tube 112 is connected by the conductor Y to the lower end terminal of the winding 119.

The input terminal 41 of the amplifier 10 is connected directly to the control grid of the tube 109. The contact of the cycle time control resistor 13 is connected through the resistor 80 to the input terminal 41 as shown in Figs. 2 and 4, and hence is connected to the control grid of the tube 109. The input terminal 46 of the amplifier 10 is connected to the grounded conductor 121, whereby the grounded portions of the apparatus are united.

The cathode of the tube 109 is connected through a decoupling and filtering resistor 122 to a terminal 123 which is maintained positive with respect to ground. The tube 109 is thus provided with suitable positive cathode bias or negative control grid bias. A decoupling and filtering condenser 124 is connected between the cathode of the tube 109 and the ground conductor 121. The resistors 89 and 13 of the cycle time control portion serve as grid resistors for the tube 109 by virtue of their connection between the control grid of the tube 109 and the conductor 121. As can readily be seen, the input signal applied to the amplifier 10 is effectively applied between the control grid and cathode of the tube 109.

The anode of the tube 109 is connected through a load resistor 125 and a decoupling and filtering resistor 126 to a terminal 127 which is maintained at a suitable positive potential with respect to ground. A coupling condenser 128 is connected between the anode of the tube 109 and the control grid of the tube 110, this control grid also being connected to the conductor 121 through a grid resistor 129. The cathode of the tube 110 is also connected to the conductor 121, whereby the output of the tube 109 is resistance coupled to the input of the tube 110. A phasing condenser 130 is connected between the anode of the tube 109 and the conductor 121, and a filtering and decoupling condenser 131 is connected between the last mentioned conductor and the junction between the resistors 125 and 126.

The output of the tube 110 is directly coupled to the parallel connected inputs of the tubes 111 and 112. To this end, the anode of the tube 110 is connected directly to the control grids of the tubes 111 and 112. A load or anode resistor 132 is connected between the anode of the tube 110 and the positive potential terminal 127, to which are also connected the cathodes of the tubes 111 and 112. It is the anode currents of the tubes 111 and 112 which maintain the terminals 123 and 127 at positive potentials with respect to the ground conductor 121, and the manner in which this is accomplished will now be described.

The anode of the tube 111 is connected through the operating winding 54 of the relay 51 to the upper end terminal of the high voltage secondary winding 116 of the transformer 115. A smoothing condenser 133 is connected in parallel with the relay winding 54. Also, the anode of the tube 112 is connected through the operating winding 134 of the safe-failure relay 113 to the other end terminal of the secondary winding 116. A smoothing condenser 135 is connected in parallel with the relay winding 134. Finally, the terminal 127, connected to the cathodes of the tubes 111 and 112 is connected through a resistor 136 to the terminal 123, which in turn is connected through a resistor 137 to the conductor 121 and hence to the secondary winding center-tap connection 117.

An analysis of the connections just described clearly indicates that the tubes 111 and 112 are supplied with alternating anode voltage from the secondary winding 116, the voltages supplied to these tubes being 180° out of phase with each other. As shown by the plus sign adjacent the end terminal of the winding 116 which is connected to the anode of the tube 111, and by the plus signs shown adjacent the supply conductor 16 and elsewhere in Figs. 2, 4, and 5, the anode voltage supplied to the tube 111 will be of supply voltage phase, while the anode voltage supplied to the tube 112 will be of a phase which is opposite to the supply voltage phase. The aforementioned plus signs indicate in the usual manner which terminals, conductors, and points have the same instantaneous relative polarity.

Since the resistors 136 and 137 are effectively included in the combined anode or load circuits of the tubes 111 and 112, the flow of anode current through these resistors produces across them a direct current potential which is utilized for supplying anode voltage to the other stages of amplification of the apparatus. Specifically, the flow of anode current through the resistors 136 and 137 is responsible for the maintenance of the terminal 127 positive with respect to the conductor 121, as it is for the maintenance of the terminal 123 positive with respect to the conductor 121. Since the load resistor 132 is connected to the terminal 127, the anode current flow through the resistors 136 and 137 actually produces the anode supply voltage for the tube 110. Similarly, the anode supply and grid bias voltages for the tube 109 are derived from the voltage developed across the resistors 136 and 137 by the anode currents of the tubes 111 and 112. A filter condenser 138 is connected between the terminal 127 and the conductor 121, and hence across the resistors 136 and 137, to cause the supply voltage developed across the last mentioned resistors to be satisfactorily free from ripple.

The values of the components of the amplifier 10 are so selected in the well-known manner that the tubes 111 and 112 are caused to conduct current at a minimum rate when no input signal is applied between the amplifier input terminals 41 and 46. Under this condition, the relays 51 and 113 are maintained in the deenergized state, since the anode currents corresponding to minimum conductivity of the tubes 111 and 112 are caused to be ineffective to energize the relays. Upon the application to the amplifier input of an input signal of supply voltage phase and of a sufficient magnitude, the conductivity of the tube 111 will be increased sufficiently to cause the flow of the required anode current to effect the energization of the control or load relay 51. The safe-failure relay 113 will remain deenergized, however, since the input signal of supply voltage phase will serve only to decrease the conductivity and anode current of the tube 112. This operation is easily explained when it is noted that an input signal of supply voltage phase will cause the control grids of the control tubes 111 and 112 to swing in the positive direction relative to their associated cathodes during the half cycles of the supply voltage in which the anode of the tube 111 is rendered positive with respect to its associated cathode. This naturally results in an increase in the conductivity of the tube 111 during said half cycles. However, during the alternate half cycles, in which the anode of the tube 112 is rendered positive with respect to its associated cathode, the input signal of supply voltage phase will swing the control grids of the tubes 111 and 112 negative with respect to their associated cathodes, whereby the conductivity of the tube 112 will be decreased below the equilibrium value.

However, upon the application to the amplifier input terminals 41 and 46 of a signal which is 180° out of phase with the supply voltage, which signal will hereinafter be referred to as an out of phase signal, the safe-failure relay 113 will be energized while the control relay 51 will be deenergized. This action occurs by virtue of the fact that the out of phase input signal causes the control grids of the tubes 111 and 112 to be driven positive with respect to their associated cathodes during the supply voltage half cycles in which the anode of the tube 112 is driven positive with respect to its associated cathode.

This action increases the conductivity of the tube 112 from the equilibrium value, and hence effects the positive energization of the winding 134 of the relay 113. At the same time, however, the control grid of the tube 111 is driven in the negative direction relative to its associated cathode during the half cycles in which the anode of the tube 111 is driven positive with respect to said cathode, whereby the conductivity of the tube 111 is reduced below the equilibrium value and the relay 51 is maintained deenergized.

As its name implies, the safe-failure relay 113 is included in the apparatus to cause the latter to "fail safe," or deenergize the controlled load, upon the occurrence of an apparatus defect or component failure of the equipment. To this end, the contacts of the relay 113 are interconnected with the load controlling contacts of the relay 51 in such a manner that various components failures within the apparatus will result in the application of heat to the furnace 1 at the minimum or zero rate, irrespective of what the furnace temperature may be at the time or subsequent thereto.

As shown in Fig. 5, and as described above, the supply conductor 17, connected to the amplifier terminal 61, is connected directly through the amplifier to the terminal 62, to which the "common" conductor 65 connects the "common" terminal of the device 59. The amplifier terminal 60, to which the supply conductor 16 is connected, is connected to a movable contact 139 of the relay 51, the contact 139 cooperating with a normally closed contact 140 and a normally open contact 141 to provide the load controlling actions of the relay 51. In the present and subsequent discussion, the term "normally" refers to the deenergized condition of the associated relay, and is employed irrespective of whether the particular relay is energized or deenergized in its normal operation. The normally closed relay contact 140 is directly connected to the amplifier terminal 63 and hence to the "low" or "cool" conductor 66. Accordingly, when the relay 51 is deenergized, as it is when no signal or an out of phase signal is applied to the input of the amplifier 10, the supply conductor 16 is directly connected to the "low" conductor 66, whereby the device 59 causes heat to be supplied to the furnace 1 at the minimum rate. This condition, which is that into which the apparatus is placed during the periods in which minimum or low heat is to be supplied to the furnace 1, is also the "safe" condition of the apparatus, since the latter is also placed in this condition by the development of an apparatus defect, no matter what the heat input demand of the furnace may be.

The normally open contact 141 of the relay 51 is connected to a movable contact 142 of the safe-failure relay 113, the contact 142 cooperating with a normally closed contact 143 and a normally open contact 144 to provide the safe-failure action of the apparatus. To this end, the normally closed contact 143 of the relay 113 is connected to the terminal 64 and hence to the "heat" or "high" conductor 67. It is clearly seen, however, that the relay 113 must be deenergized if the energization of the relay 51 is to energize the conductor 67 and cause the device 59 to supply heat to the furnace 1 at the maximum input rate. Finally, the normally open contact 144 of the relay 113 is connected to the connected contact 140 and terminal 63.

*Safe-failure aspects*

While it would not be practical to elaborate herein on all of the various component failures and combinations of such failures which will place the subject apparatus in its "safe" condition, certain types of failures well known in the electronic art, and the resulting operations of the present apparatus in the presence of such failures, will now be discussed. In each case, it will be shown that the particular failure or failures will cause the apparatus to assume the "safe" condition, wherein the "low" conductor 66, but not the "high" conductor 67, will be connected to the supply conductor 16.

In connection with each of the examples to be considered, it should be noted that the apparatus will be in a "safe" condition, or will fail safe, when the relay 51 is positively deenergized, irrespective of whether the relay 113 is energized or not, or when the relays 51 and 113 are positively energized simultaneously. Any conditions providing either of these actions will cause the apparatus to fail safe.

As an illustration of one type of component failure often encountered in the electronics art, let it be assumed that heater burnout or other similar occurrence results in a loss of emission within the tube 109. If this occurs, no in-phase signal can reach the control grid of the tube 111, whereby the relay 51 will be maintained in the deenergized condition. The apparatus will therefore fail safe as noted above.

If loss of emission occurs within the tube 110, due to heater burnout or other cause, the tube 110 will no longer draw anode current through the resistor 132. This will remove the negative grid bias from both of the tubes 111 and 112 and will therefore cause a simultaneous increase in the conductivities of the tubes 111 and 112 to some new, higher value. This in turn will result in the energization of both of the relays and the establishment of a "safe" condition.

Upon the occurrence of burnout of the heater of either of the tubes 111 and 112, the other of these tubes will be simultaneously rendered non-conductive by virtue of the series connection of the heaters of these tubes. The resulting positive deenergization of the relays 51 and 113 will cause the apparatus to fail safely.

If a short-circuit should develop between the heater and cathode of either of the tubes 109 and 110, no unsafe condition will be produced in the apparatus. In the case of the tube 110, such a short-circuit will at worst produce the same effect as heater burnout, and safe-failure will result as noted above. In the case of the tube 109, the resulting voltage applied to the cathode of the tube from the associated heater will cause the application to the tube 111 of an out of phase control grid signal which will effectively maintain the relay 51 deenergized and in the safe-failure position.

If either of the tubes 111 and 112 should develop a short-circuit between its cathode and associated heater, the resistors 136 and 137 will, in effect, be at least partially short circuited, due to the connection of the heater winding center-tap 120 to the conductor 121. This will substantially reduce the potential existing between the terminal 127 and the conductor 121, and hence will reduce the anode supply voltage to the tube 110. This in turn will cause a significant decrease in the anode current drawn by the tube 110, with a resulting decrease in the negative grid bias for the tubes 111 and 112 normally developed across the resistor 132. Accordingly, the conductivities of the tubes 111 and 112 will be increased simultaneously, with the result that relays 51 and 113 will be simultaneously energized as noted above. The effective short circuiting of the resistors 136 and 137 will further insure the energization of the relays 51 and 113 by effecting an increase in the anode supply voltage to the tubes 111 and 112.

If the relay 51 should become jammed in the energized position, as by the normally open contacts being "frozen" in engagement, the resulting continuous energization of the "on" follow-up heater 38 will quickly cause the application to the input of the amplifier 10 of an out of phase signal which will be effective to cause the energization of the relay 113. Since both relays will then be in the energized condition, safe failure will be accomplished.

In the event that the "on" follow-up heater 38 should become open-circuited, the operation of the apparatus will be affected only to the extent that the cycle time will be increased appreciably. The cooling of the "off" elements 27 and 37, which normally occurs when the relay 51 is energized, will slowly give the same effect as the heating of the "on" elements 28 and 38 would have given in the absence of burnout of the heater 38. Accordingly, such burnout will not produce an unsafe condition of apparatus operation.

A short circuit which may develop between the control grid and cathode of either of the tubes 111 and 112 will remove the negative grid bias from both tubes, which will cause the equal energization of the tubes and of the relays 51 and 113 as noted hereinbefore.

Similarly, as the last example, it is noted that open-circuiting of the resistor 132 will remove the anode supply voltage from the tube 110 and will cause an increase in the negative grid bias on the tubes 111 and 112, hence causing the simultaneous deenergization of the relays 51 and 113.

From the above it should be obvious that the common failures most likely to occur in electronic apparatus of the type being described will not cause the development of an unsafe condition in the apparatus, but will, instead, place the latter in a safe-failure condition.

In addition to the components described above, the amplifier 10 of Fig. 5 includes a current-limiting resistor 145 which is connected in series with the indicating lamp 114 between the relay contact 139 and the relay contact 144. As will be readily apparent, the lamp 114 will be illuminated only when the relay 51 is energized while the relay 113 is deenergized or, in other words, only when the "high" conductor 67 is energized. The lamp 114 therefore serves to indicate when the apparatus is in the "load on" condition.

It will be noted that a condenser 146 is shown in Fig. 5 as being connected between the conductors connected to the amplifier terminals 62 and 63, while a condenser 147 is connected between the terminals 62 and 64. These condensers serve the purpose of minimizing arcing of the relay contacts when the latter disengage, and hence serve to minimize the feedback of transient signals over the supply conductors 16 and 17.

Cycle time control advantages

Before concluding the description of the circuit of the amplifier 10, certain comments in regard to the cycle time control connections appear to be desirable. In the first place, it should be noted that the method of controlling cycle time illustrated herein possesses a distinct advantage over other, conventional methods, wherein cycle time control is obtained by merely reducing the sensitivity of the associated amplifier as by shunting from the input a portion of the signal conveyed thereto from the associated equipment. However, it should be apparent that the cycle time control means of the present apparatus does not effect any such desensitizing function in exercising its cycle time control.

Secondly, the particular cycle time control arrangement herein illustrated operates effectively to prevent chatter of the relay 51 even under the condition of very slow cycle time. In explaining this chatter-eliminating function, it should be remembered that the connection between the relay contact 50 and the amplifier input terminal 41 causes the application to the amplifier input of an in-phase relay-energizing signal when the relay 51 is energized, and a relay deenergizing, out of phase signal when the relay 51 is deenergized. Accordingly, if the relay 51 is energized, and the resultant amplifier input signal decreases sufficiently towards zero to cause deenergization of the relay, the relay energizing signal fed back through the cycle time control circuit to the amplifier input will disappear at the instant that the contact 50 is separated from the contact 52. Accordingly, the resultant amplifier input signal will suddenly decrease even further, and may even become an out of phase signal. This action will, of course, insure the positive deenergization of the relay 51. Finally, as the contact 50 moves into engagement with the contact 53, the resultant amplifier input signal will be decreased further if still an in-phase signal, or will be increased further if an out of phase signal, due to the application to the amplifier input of the out of phase signal component fed back through the cycle time control connection. This action will even more positively establish the deenergization of the relay 51.

To summarize the above, the cycle time control connection serves to minimize relay chatter in the apparatus by causing the opening of the closed relay contacts to remove from the amplifier input a signal component tending to hold said contacts closed, and by causing the subsequent closing of the previously open relay contacts to cause the application to the amplifier input of a signal component tending to maintain closed the last mentioned contacts.

The reset amplifier 11 of Fig. 5

The reset amplifier 11 of Fig. 5 is seen to include a first amplifying stage triode electron tube 148, a second amplifying stage triode electron tube 149, and power amplifying triode electron tubes 150 and 151. Each of the tubes 148 through 151 includes anode, control grid, cathode, and cathode heater elements in the usual manner. Also included in the amplifier 11 are the fast reset rate control resistor 12, the portion 106 of the "manual"—"automatic" switch, and various other circuit components to be described.

The heaters of the tubes 148 through 151 are energized from the transformer secondary winding 119 through the partially shown conductors X and Y and the conductor 121. Specifically, one of the terminals of the heater of the tube 148 is connected by the conductor X to the upper end terminal of the winding 119, while the lower end terminal thereof is connected by the conductor Y to one of the terminals of the heater of the tube 149. The remaining heater terminals of the tubes 148 and 149 are connected to the ground conductor 121 and hence to the center-tap connection 120 of the winding 119. Accordingly, the heater of the tube 148 is connected across the upper half of the winding 119, while the heater of the tube 149 is connected across the lower half of this winding.

In addition, one terminal of the heater of the tube 150 is connected by the conductor X to the upper end terminal of the winding 119, while the lower end terminal thereof is connected by the conductor Y to one terminal of the heater of the tube 151. The remaining heater terminals of the tubes 150 and 151 are connected together, whereby the heaters of the tubes 150 and 151 are energized in series across the entire winding 119.

As shown, the input terminal 48 of the amplifier 11 is directly connected to the control grid of the tube 148, while the cathode of the latter is connected to the input terminal 49 and to the ground conductor 121. Accordingly, the input signal applied to the amplifier 11 between the terminals 48 and 49 is effectively applied between the control grid and cathode of the tube 148. A grid resistor 152 is connected between the control grid and cathode of the tube 148 in the conventional manner.

An anode resistor 153 is connected between the anode of the tube 148 and the aforementioned junction between the resistors 125 and 126. Accordingly, the resistor 153 supplies anode voltage to the tube 148 from the positive terminal 127. The anode of the tube 148 is also connected to a "manual" contact 154 of the switch portion 106, while a movable contact 155 of this switch portion is connected to the ground conductor 121. Accordingly, when the switch portion 106 is in the "manual" position, in which the members 154 and 155 are in contact, the output of the tube 148 is effectively short-circuited, whereby the reset amplifier 11 is positively maintained in the same condition as when no input signal is applied thereto. This serves as a positive means of preventing the fast reset action in the apparatus when the "manual"—"automatic" switch is in the "manual" position, since under this condition the reset heaters 39 and 40 are positively maintained equally energized in spite of any input signals which may be applied to the reset amplifier 11. As noted hereinbefore, the switch portions 105 and 106 are advantageously mechanically interconnected or ganged, whereby the reset amplifier 11 is rendered inactive to effect differential heating of the reset heaters 39 and 40 at those times during which the outputs of the reset and slidewire bridges are disconnected from the input of the amplifier 10.

The switch portion 106 is also provided with an "automatic" contact 156 which is connected to one terminal of a neon signal lamp 157. The other terminal of the latter is connected through a current limiting resistor 158 to the upper end terminal of the transformer secondary winding 116. Accordingly, the signal lamp 157 is illuminated when and only when the "manual"—"automatic" switch is in the "automatic" position, shown in Figs. 4 and 5, whereby the lamp 157 provides an indication that the apparatus is in the automatic condition.

The output of the tube 148 is resistance coupled to the input of the tube 149. To this end, a coupling condenser 159 is connected between the anode of the tube 148 and one end terminal of the reset rate resistor 12, while the movable contact of the latter is directly connected to the control grid of the tube 149. The remaining end terminal of the resistor 12 is connected to the cathode of the tube 149, and is connected to a junction 160 between a first resistor 161 and a second resistor 162. The latter are connected in series between the anodes of the tubes 111 and 112, the resistor 161 being connected between the anode of the tube 111 and the junction 160, while the resistor 162 is connected between the junction 160 and the anode of the tube 112. Due to the cooperating action of the tubes 111 and 112, the relay windings 54 and 134, and the transformer secondary winding 116, the junction 160 is maintained at a negative potential relative to the ground conductor 121. The negative potential between the junction 160 and ground naturally tends to pulsate at twice the supply voltage frequency, due to the alternate conduction of the tubes 111 and 112. However, a filter condenser 163 is connected between the junction 160 and the ground conductor 121, whereby the negative potential between the junction 160 and ground is maintained satisfactorily ripple-free. The aforementioned connection of the cathode of the tube 149 and of the resistor 12 to the junction 160 provides suitable anode supply voltage for the tube 149 as will be brought out hereinafter.

As can readily be seen from Fig. 5, the resistor 12 serves as a grid resistor for the tube 149, and simultaneously provides a means for adjusting the magnitude of the input signal applied to the tube 149 from the tube 148. It is believed to be apparent, therefore, that the resistor 12 permits the manual adjustment of the fast reset rate action of the apparatus by permitting control of the amount of amplifier input signal which is permitted to effect control of the tube 149 and following tubes 150 and 151.

The output of the tube 149 is directly coupled to the parallel connected inputs of the tubes 150 and 151. To this end, the anode of the tube 149 is connected to the control grids of the tubes 150 and 151, while the cathode of the tube 150 is connected through an adjustable resistor 164 to the cathode of the tube 151 which, in turn, is connected through a cathode bias resistor 165 to the ground conductor 121. In addition, a load resistor 166 for the tube 149 is connected between the anode of the latter and the ground conductor 121. The above described connections are believed to make apparent the manner in which the connection of the tube 149 to the resistor junction 160 provides anode supply voltage for the tube 149. For clarity, however, the anode circuit of the tube 149 may be traced from the negative junction 160 to the cathode of the tube 149, through the latter to the anode thereof, and from the anode through the resistor 166 to the conductor 121 which, as noted above, will be positive with respect to the junction 160. Since the signal output of the tube 149 appears across the resistor 166, and since the control grids of the tubes 150 and 151 are connected to the upper end terminal of the resistor 166 while the lower end grounded terminal thereof is connected to the cathodes of the tubes 150 and 151, the output of the tube 149 is effectively coupled to the inputs of the tubes 150 and 151. The function of the adjustable resistor 164 will be described in detail hereinafter.

The anode of the tube 150 is connected to the output terminal 73 of the reset amplifier 11, and hence is connected to the conductor 77 and to one end terminal of the "on" reset heater 39. The other end terminal of the latter is connected by the conductor 76 to the amplifier output terminal 72, from where it is connected to the upper end terminal of the transformer secondary winding 116. Similarly, the anode of the tube 151 is connected to the amplifier output terminal 71 and thence by means of conductor 75 to one end terminal of the "off" reset heater 40, the remaining terminal of which is connected by the conductor 74 to the amplifier terminal 70 and thence to the lower end terminal of the winding 116. Therefore, assuming momentarily that the contact of the resistor 164 is at the lower end of the resistor, causing the latter to be short-circuited, the anode circuit of the tube 150 can be traced from the upper end terminal of the winding 116 to the terminal 72, over the conductor 76, through the "on" reset heater 39, over the conductor 77 to the terminal 73, and thence to the anode of the tube 150, through the latter to the cathode thereof, through the resistor 165 to the conductor 121, and over the latter to the winding center-tap connection 117. Accordingly, it can readily be seen that the "on" reset heater 39 is energized from the upper half of the secondary winding 116 under the control of the tube 150.

In a similar manner, the anode circuit of the tube 151 can be traced from the lower end terminal of the winding 116 to the terminal 70, over the conductor 74 to the "off" reset heater 40, through the latter and over the conductor 75 to the terminal 71, from the latter to the anode of the tube 151, through this tube to the cathode thereof, and thence through the resistor 165 to the conductor 121 and over the latter to the center-tap connection 117. Accordingly, these connections provide energization of the "off" reset heater 40 from the lower half of the secondary winding 116 under the control of the tube 151.

As has been repeatedly brought out hereinbefore, the reset heaters 39 and 40 are substantially equally energized when no signal is applied to the input of the reset amplifier 11 between the terminals 48 and 49. With reference to Fig. 5, this means that the tubes 150 and 151 are normally maintained equally conductive at a minimum or so-called equilibrium value when no input signal is applied to the reset amplifier and hence when no signal is transmitted to the tubes 150 and 151 from the tubes 148 and 149. Under this condition, the tubes 150 and 151 are so biased that they are equally conductive at the equilibrium value. For the present, it will again be assumed that the resistor 164 is entirely short-circuited.

Upon the application to the input terminals 48 and 49 of an in-phase signal, as occurs upon upward displacement of the contact 14 from the control point, the control grid of tube 150 will be swung in the positive direction relative to the associated cathode during the supply voltage half cycles in which the anode of the tube 150 is swung positive with respect to the last mentioned cathode. This will, of course, increase the conductivity of the tube 150 above the equilibrium value, and hence will result in an increase in the energization of the "on" reset heater 39 as is desirable for such a displacement of the contact 14. Simultaneously, the control grid of the tube 151 will be swung in the negative direction during the supply voltage half cycles in which the anode of the tube 151 is made positive, whereby the conductivity of the tube 151, and hence the energization of the "off" reset heater 40, will be reduced below their equilibrium values. The cooperation of these two effects is to cause the aforementioned differential heating of the reset heaters 39 and 40, the "on" heater 39 then being heated to the greater extent.

Similarly, upon the application of an out of phase signal to the input of the amplifier 11, as occurs upon downward displacement of the contact 14 from the control point, the conductivity of the tube 150 will be decreased, as will the energization of the "on" reset heater 39, while the conductivity of the tube 151 and the energization of the "off" reset heater 40 will be increased. This will result in the above described differential energization of the reset heaters corresponding to a controlled temperature increase above the control point, the "off" reset heater being heated to a greater extent for this condition. The circuit of Fig. 5 is believed to make readily apparent the manner in which the different input signals to the amplifier 11 result in the corresponding differential energization of the reset heaters 39 and 40. It should also be noted that the changes in reset heater energization will, in each instance, be a function of the magnitude of the amplifier input signal which causes the changes throughout the normal range of variation of the magnitude of such signals.

As is readily apparent from Fig. 5, the amplifier 10 actually supplies all of the various energizing voltages utilized by the reset amplifier 11, these voltages being supplied to the amplifier 11 by the various conductors interconnecting the latter with the amplifier 10. It was these conductors, considered as a group, which were referred to earlier as the interconnecting power cable 79 shown connecting the amplifiers 10 and 11 in Figs. 2 and 4.

The function of the adjustable resistor 164 in the cathode circuit of the tube 150 will now be described. This adjustable resistor provides so-called approach rate control, by making adjustable the cathode bias applied to the tube 150. Such control has been found to be desirable and to produce advantageous operation in certain control applications. Actually, by the adjustment of the resistance of the resistor 164, the "on" reset rate may be limited to desired maximum values without affecting the rate to which the "off" reset is effected. In other words, as the resistor 164 is adjusted so as to introduce a given amount of resistance into the cathode circuit of the tube 150, the rate at which the fast reset action will operate to increase the average rate of furnace heat input will be limited to a value corresponding to said amount of introduced resistance. However, the rate to which the fast reset effect will be produced in the apparatus in a direction to reduce the average rate of furnace heat input will not be affected by the limitation placed on the rate of reset which increases the input to the load.

Since the action just described amounts to limiting the rate of reset which acts to return the controlled temperature to the control point value, it may be said that the setting of the resistor 164 limits the "upscale" reset rate without affecting "downscale" reset rate. Accordingly, the term "approach rate control" is seen to be applicable to the adjustable resistor 164. To facilitate the adjustment of this resistor, the movable contact of the latter is provided with a suitable knob 167.

Safe failure aspects

The circuit connections of the reset amplifier 11 of Fig. 5 are such as to prevent this amplifier from producing an unsafe control condition in the apparatus due to failure of one or more components of this amplifier. As in the case of the amplifier 10, it is not practical herein to elaborate on all of the various component failures and combinations of such failures which could occur within the amplifier 11 and which would not subject the apparatus to an unsafe condition of operation. However, there will be discussed below several of the types of failures more common in the field of electronics and hence more likely to occur in electronic apparatus. In each case, it will be shown that the particular failure does not result in the production of an unsafe condition of operation of the apparatus.

If heater burnout occurs in either of the tubes 150 or 151, the other of these tubes will be simultaneously rendered non-conductive, due to the series connection of the heaters of these tubes. Accordingly, such burnout will completely de-energize both of the reset heaters, and will entirely eliminate from the apparatus the fast reset action. However, the slow reset action will be operative in the same manner as described above. It is obvious that this is not an unsafe operating condition of the apparatus.

Burnout of the heater of the tube 148 will merely cause the reset heaters to be equally energized at the aforementioned equilibrium value, whereby no unsafe condition will be produced. Further, burnout of the heater of the tube 149 will cause the disappearance of the anode current through, and the resultant voltage across, the resistor 166, whereby the normal negative grid bias obtained from the resistor 166 will be removed from the tubes 150 and 151. This will result in the equal energization of the reset heaters at some new, higher value, but again will not produce an unsafe operating condition.

The development of a heater-cathode short-circuit in either of the tubes 148 or 149 will not produce an unsafe condition, since, in the case of the tube 148, such a short-circuit will, at worst, produce the same effect as heater burnout. In the case of the tube 149, the resulting voltage applied to the cathode of the tube from the associated heater will cause the application to the tubes 150 and 151 of a signal of such phase that the "off" reset heater will be energized more than is the "on" heater. A safe operating condition will therefore result.

Finally, if either of the tubes 150 and 151 should experience an emission failure, there would still be available in the apparatus the fast reset action in the direction corresponding to the unaffected tube, while only the slow reset action would be available in the direction corresponding to the defective tube. This would obviously not produce an unsafe control or operating effect in the apparatus.

Figure 6:
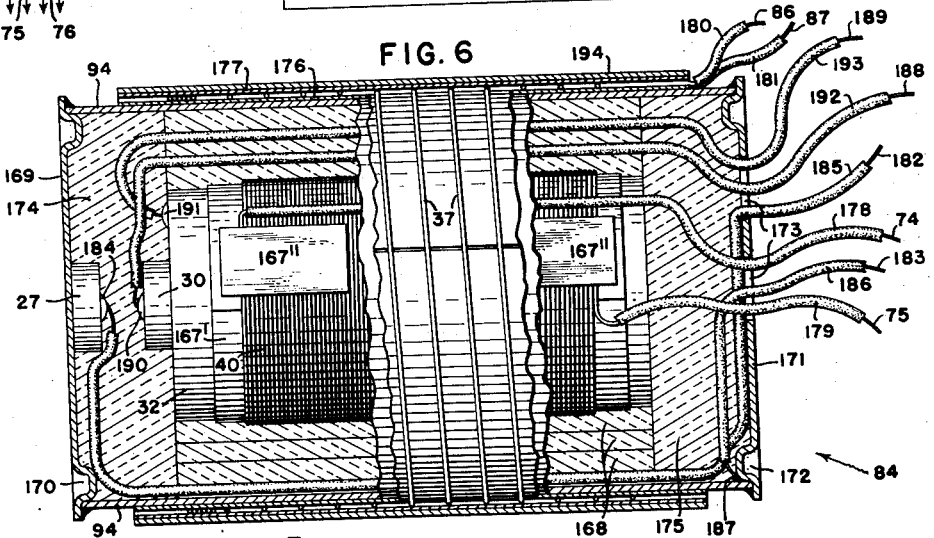
Fig. 6 is a view, taken partly in section, of one of the terminal devices of Figs. 2 and 4.

*Description of the Fig. 6 device*

We have illustrated in Fig. 6 a preferred form of the thermal units 84 and 85 which have been shown more or less diagrammatically in the previous figures. Specifically, Fig. 6 illustrates the detailed construction of the thermal "off" unit 84. It is to be understood, however, that the "on" thermal unit 85 may well be identical to the illustrated unit 84 of Fig. 6.

The device 32 of high heat capacity is seen in the Fig. 6 arrangement to be a cylindrical member located in the interior of the unit 84. The device 32 is preferably a solid cylinder of a metal having a high specific heat, and hence may well be constructed of copper. The "off" reset resistor 30 is shown as a negative temperature coefficient, or NTC, resistor of the disc type which is secured in good heat transfer relation to the left-hand end of the device 32. By virtue of this construction, changes in the temperature of the resistor 30 are retarded by the high thermal capacity of the device 32.

The "off" reset heater 40 is seen in Fig. 6 to consist of a heater winding which is wound on the surface of the cylindrical device 32. The heater 40 is advantageously formed of suitably insulated wire which is closely wound over a substantial portion of the device 32. A thin wrapping of electrical insulating material 167' is interposed between the device 32 and the heater 40 which is wound thereon. Strips of thin electrical insulating material 167'' aid in holding the heater winding 40 together on the surface of the material 167' and device 32. Accordingly, this construction provides for the heat coupling 93 illustrated diagrammatically in Fig. 3.

The entire "off" reset unit, including the elements 30, 32, and 40, is centered within the shell 94 of the device 84, and is held in this position by layers of suitable heat insulating material 168 which are wound around the reset unit. The shell 94 is provided with a disc-like left-hand end closing member 169 having an annular depression 170 adjacent the disc periphery. The depression 170 engages the left-hand end of the cylindrical shell 94, and provides suitable abutting surfaces by means of which the end member 169 may be secured, as by soldering, to the shell 94.

The "off" follow-up resistor 27 is shown in Fig. 6 as a disc-type NTC resistor which is secured to the end member 169 and hence is maintained in good heat transfer relationship with the member 169 and shell 94.

An end closure member 171 is provided for the right-hand end of the shell 94. The member 171 has an annular depression 172 which serves, as in the case of the left-hand end member, to provide a means for securing the member 171 to the shell 94. The member 171 is provided with suitable openings 173 through which pass the various conductors or leads which are connected to the elements located within the shell 94.

Additional heat insulating material 174 is located between the end member 169 and the left-hand end of the device 32, while insulating material 175 is placed between the end member 171 and the right-hand end of the device 32. By this it can be seen that the entire reset unit is suitably supported in a central position within the device 84, and is thermally insulated therefrom by the material 168, 174, and 175. The resulting low conductance thermal coupling between the follow-up resistor 27 and the reset elements 30, 32, and 40 is that illustrated diagrammatically at 95 in Fig. 3.

The "off" follow-up heater 37 is shown in Fig. 6 as being space-wound over practically the entire surface of the shell 94. The heater 37 is preferably wound of insulated wire, and is further electrically insulated from the shell 94 by means of a wrapping of thin insulating material 176. An outer wrapping of insulating material 177 surrounds the heater winding 37 for mechanical protection and electrical insulating purposes. As shown in Fig. 6, the heater winding 37 is advantageously bunched or concentrated in the vicinity of the resistors 27 and 30, it having been found desirable to do this in order to permit the attainment of fast cycle times in the apparatus.

By virtue of the mounting of the follow-up resistor 27 on the end member 169, and by virtue of the bonding of the member 169 to the shell 94 on which is wound the follow-up heater 37, a high conduction thermal coupling is established between the heater 37 and resistor 27. It is this coupling which is illustrated diagrammatically at 83 in Fig. 3. In addition, a low conductance thermal coupling exists through the insulation 168, 174, and 175 between the follow-up heater 37 and the reset resistor 30, and it is this heat coupling which is illustrated diagrammatically at 92 in Fig. 3.

The conductors 74 and 75, connected to the end terminals of the heater 40, are seen to be covered with suitable sleeves of insulating material 178 and 179, respectively, and pass through one of the openings 173 in the end member 171. Similarly, the conductors 86 and 87 for the heater 37 are supplied with respective insulating sleeves 180 and 181. Connections to the resistor 27 are provided by a conductor 182 and a conductor 183. The conductor 182 has one end soldered at 184 to the right-hand face or terminal of the resistor 27, and is supplied with an insulating sleeve 185. The conductor 183 is provided with an insulating sleeve 186 and has one end soldered to the shell 94 and end member 171 at 187. Since the left-hand face or terminal of the resistor 27 is also electrically connected to the shell 94 by virtue of its mounting on the end member 169, the conductor 183 is actually electrically connected to the left-hand terminal of the resistor 27. The conductors 182 and 183 and their insulating sleeves 185 and 186 pass from the interior of the unit 84 through the openings 173 in the end member 171.

Electrical connections are made to the reset resistor 30 by means of conductors 188 and 189. Specifically, one end of the conductor 188 is soldered at 190 to the left-hand face or terminal of the resistor 30, while one end of the conductor 189 is soldered at 191 to the left-hand end of the device 32. Actually however, the conductor 189 is connected to the right-hand face or terminal of the resistor 30, due to the electrical connection formed between this terminal and the device 32 by the mounting of the resistor 30 on the device 32. The conductors 188 and 189 are advantageously provided with respective insulating sleeves 192 and 193 which pass through one of the openings 173 in the member 171.

The unit 84 is also provided with the outer metallic shell mentioned above in connection with the description of the rate action effects produced in the apparatus. This shell is designated by the reference character 194 in Fig. 6, and is seen to surround the entire unit 84, being electrically insulated from the heater winding 37 by the insulating material 177. The shell 94 contributes materially to the rate action obtainable in the apparatus, as previously noted.

Typical component values

By way of illustration and example, and not by way of limitation, we have listed below the actual values of the components used by us in a working model of the control apparatus described herein, which model was found to operate and function properly in the desired manner as outlined hereinbefore.

| Component No. | Name | Value |
|---|---|---|
| 8 | Instrument slidewire resistor | 50 to 1,000 ohms. |
| 12 | Reset rate control resistor | 1 megohm. |
| 13 | Cycle time control resistor | Do. |
| 19 | Trans. sec. winding | 12.6 volts, c. t. |
| 27 | N. T. C. follow-up resistor | 45K ohms at 37.8° C. |
| 28 | do | Do. |
| 29 | N. T. C. reset resistor | Do. |
| 30 | do | Do. |
| 37 | Follow-up heater | 159 ohms. |
| 38 | do | Do. |
| 39 | Reset heater | 9K ohms, 0.7 watts maximum. |
| 40 | do | Do. |
| 42 | Resistor | 19K ohms. |
| 43 | Prop. band control resistor | 20K ohms. |
| 44 | Resistor | 120K ohms. |
| 45 | do | Do. |
| 54 | Relay winding | 5K ohms. |
| 80 | Resistor | 1.8 megohms. |
| 97 | do | 12K ohms. |
| 98 | Manual control resistor | 500 ohms. |
| 101 | Resistor | 3K ohms. |
| 102 | do | Do. |
| 103 | do | 19K ohms. |
| 109 | Electron tube | 12AX7. |
| 110 | do | 12AX7. |
| 111 | do | 12AU7. |
| 112 | do | 12AU7. |
| 114 | Neon lamp | NE51. |
| 116 | Trans. sec. winding | 550 volts, c. t. |
| 119 | do | 12.6 volts, c. t. |
| 122 | Resistor | 1K ohm. |
| 124 | Condenser | 50 mfd. |
| 125 | Resistor | 470K ohms. |
| 126 | do | 10K ohms. |
| 128 | Condenser | 0.0022 mfd. |
| 129 | Resistor | 10 megohms. |
| 130 | Condenser | 0.0056 mfd. |
| 131 | do | 20 mfd. |
| 132 | Resistor | 390K ohms. |
| 133 | Condenser | 10 mfd. |
| 134 | Relay winding | 5K ohms. |
| 135 | Condenser | 10 mfd. |
| 136 | Resistor | 10K ohms. |
| 137 | do | 120 ohms. |
| 138 | Condenser | 40 mfd. |
| 145 | Resistor | 180K ohms. |
| 146 | Condenser | 0.1 mfd. |
| 147 | do | 0.1 mfd. |
| 148 | Electron tube | 12AX7. |
| 149 | do | 12AX7. |
| 150 | do | 12AU7. |
| 151 | do | 12AU7. |
| 152 | Resistor | 1K ohm. |
| 153 | do | 100K ohms. |
| 157 | Neon lamp | NE51. |
| 158 | Resistor | 470K ohms. |
| 159 | Condenser | 0.047 mfd. |
| 161 | Resistor | 390K ohms. |
| 162 | do | Do. |
| 163 | Condenser | 5 mfd. |
| 164 | App. rate control resistor | 5K ohms. |
| 165 | Resistor | 220 ohms. |
| 166 | do | 2.7 megohms. |

It is believed to be apparent from the foregoing description that the control apparatus of the present invention as described herein admirably fulfills all of the objects and requirements set forth at the beginning of this specification, and constitutes a novel and useful improvement in the art of automatic control.

Subject matter disclosed but not specifically claimed herein is being disclosed and claimed in our copending divisional application, Serial No. 349,668, which was filed on April 20, 1953, and is directed to the thermal unit of Fig. 6.

While, in accordance with the provisions of the statutes, we have illustrated and described the best form of the invention now known to us, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described our invention, what we claim as new and desire to secure by Letters Patent is as follows:

1. Electrical control apparatus for effecting time-proportioning control with automatic reset action comprising a regulator adapted to restrict to alternate predetermined minimum and maximum rates the flow of an agent which determines the actual value of a controlled variable, the average rate of flow of said agent during any given period of time being proportional to the ratio of the time of maximum flow during said period to the total length of said period, a first means operative to create an alternating voltage control signal having a magnitude and phase which are respectively dependent upon the extent and direction of the difference between the actual value of said controlled variable and a predetermined value thereof, a second means operative under the control of said regulator to create an alternating voltage follow-up signal which gradually changes in magnitude and shifts in phase in a predetermined manner with changes in said ratio, a third means operative under the control of said regulator to create an alternating voltage reset signal which gradually attains a magnitude and phase which are respective functions of the extent and direction of departure of said ratio from a median value, and means operative to apply the resultant of said control, follow-up, and reset signals to said regulator, the latter being operative under the control of said resultant signal to produce said minimum and maximum flow rates alternately and to adjust said ratio to a value which is above or below said median value, depending upon the phase of the resultant of said control and reset signals, by an amount which is substantially proportional to the magnitude of the last mentioned resultant signal, whereby said ratio is established as necessary to reduce said control signal to zero and to maintain an equilibrium condition between said follow-up and reset signals.

2. Apparatus as specified in claim 1, wherein said regulator includes a portion operative to produce a cycle time control signal of the phase of the first mentioned resultant signal, and wherein there are included adjustable means connected to the last mentioned portion of said regulator and operative to add to said first mentioned resultant signal a selected portion of said cycle time control signal, whereby the total length of each of said periods is determined by the adjustment of said adjustable means.

3. Electrical control apparatus for effecting time-proportioning control with automatic reset action comprising a regulator adapted to restrict to alternate predetermined minimum and maximum rates the flow of an agent which determines the actual value of a controlled variable, the average rate of flow of said agent during any given period of time being proportional to the ratio of the time of maximum flow during said period to the total length of said period, a first means operative to create an alternating voltage control signal having a magnitude and phase which are respectively dependent upon the extent and direction of the difference between the actual value of said controlled variable and a predetermined value thereof, a second means operative under the control of said regulator to create an alternating voltage follow-up signal which gradually changes in magnitude and shifts in phase in a predetermined manner with changes in said ratio, a third means operative under the control of said regulator to create an alternating voltage reset signal which gradually increases in magnitude toward a maximum value, with a phase which is the same as that of said control signal, as long as the magnitude of the latter is different from zero, and which, upon the subsequent disappearance of said control signal, attains a magnitude and phase which are respective functions of the extent and direction of departure of said ratio from a median value, and means operative to apply the resultant of said control, follow-up, and reset signals to said regulator, the latter being operative under the control of said resultant signal to produce said minimum and maximum flow rates alternately and to adjust said ratio to a value which is above or below said median value, depending upon the phase of the resultant of said control and reset signals, by an amount which is substantially proportional to the magnitude of the last mentioned resultant signal, whereby said ratio is established as necessary to reduce said control signal to zero and to maintain an equilibrium condition between said follow-up and reset signals.

4. Electrical control apparatus for effecting time-proportioning control with automatic reset action comprising a regulator adapted to restrict to alternate predetermined minimum and maximum rates the flow of an agent which determines the actual value of a controlled variable, the average rate of flow of said agent during any given period of time being proportional to the ratio of the time of maximum flow during said period to the total length of said period, a first means operative to create an alternating voltage control signal having a magnitude and phase which are respectively dependent upon the extent and direction of the difference between the actual value of said controlled variable and a predetermined value thereof, a second means including first thermally sensitive resistors and operative to create an alternating voltage follow-up signal having a magnitude and phase which are respectively dependent upon the magnitude and direction of the difference between the resistances of said first resistors, first means operative under the control of said regulator to heat said first resistors differentially so that said follow-up signal gradually changes in magnitude and shifts in phase in a predetermined manner with changes in said ratio, a third means including second thermally sensitive resistors and operative to create an alternating voltage reset signal having a magnitude and phase which are respectively dependent upon the magnitude and direction of the difference between the resistances of said second resistors, second means operative under the control of said regulator to heat said second resistors differentially so that said reset signal gradually attains a magnitude and phase which are respective functions of the extent and direction of departure of said ratio from a median value, and means operative to apply the resultant of said control, follow-up, and reset signals to said regulator, the latter being operative under the control of said resultant signal to produce said minimum and maximum flow rates alternately and to adjust said ratio to a value which is above or below said median value, depending upon the phase of the resultant of said control and reset signals, by an amount which is substantially proportional to the magnitude of the last mentioned resultant signal, whereby said ratio is established as necessary to reduce said control signal to zero and to maintain an equilibrium condition between said follow-up and reset signals.

5. Electrical control apparatus for effecting time-proportioning control with automatic reset action comprising a regulator adapted to regulate the flow of an agent which determines the actual value of a controlled variable and adjustable into alternate first and second conditions corresponding respectively to minimum and maximum instantaneous rates of flow of said agent, the average rate of flow of said agent during any given period of time being proportional to the ratio of the duration of the portion of said period during which said regulator assumes said second condition to the total length of said period, said regulator having an input portion and being operative to assume said first condition, said second condition, or said first condition accordingly as no signal, a resultant signal of one phase, or a resultant signal of opposite phase is applied to said input portion, a first means operative to create an alternating voltage control signal of predetermined frequency having a magnitude which is dependent upon the extent of the difference between the actual value of said controlled variable and a predetermined value thereof, said control signal being of said one phase or of said opposite phase according to the direction of said difference, a second means operative under the control of said regulator to create an alternating voltage follow-up signal of said frequency which gradually changes in character so as to increase in magnitude with said one phase, or to decrease in magnitude with said opposite phase, when said regulator is in said first condition, and to increase in magnitude with said opposite phase, or to decrease in magnitude with said one phase, when said regulator is in said second condition, means operative to apply said follow-up signal to said input portion, whereby said regulator is rendered operative to assume said first and second conditions alternately, a third means operative under the control of said regulator to create an alternating voltage reset signal of said frequency which gradually attains a magnitude which is a function of the extent of the departure of said ratio from a median value and which is of said one phase or of said opposite phase accordingly as said ratio attains a value which is above or below said median value, and means operative to apply said control and reset signals to said input portion to render said regulator responsive to the resultant of said control, follow-up, and reset signals and hence operative to adjust said ratio to said median value when the magnitude of the resultant of said control and reset signals is equal to zero, and to adjust said ratio to a value which is above or below said median value by an amount which is substantially proportional to the magnitude of the last mentioned resultant signal accordingly as the latter is of said one phase or of said opposite phase, whereby the value of said ratio is established as necessary to reduce the magnitude of said control signal to zero and to maintain an equilibrium condition between said follow-up and reset signals.

6. Apparatus as specified in claim 5, wherein said regulator includes a portion operative to produce a cycle time control signal of said one phase or of said opposite phase accordingly as said regulator is in said second or said first condition, and wherein there are included adjustable means connected between the last mentioned portion of said regulator and said input portion thereof and operative to apply to said input portion a selected portion of said cycle time control signal, whereby the total length of each of said periods is determined by the adjustment of said adjustable means.

7. Electrical control apparatus for effecting time proportioning control with automatic reset action comprising a regulator adapted to regulate the flow of an agent which determines the actual value of a controlled variable and adjustable into alternate first and second conditions corresponding respectively to minimum and maximum instantaneous rates of flow of said agent, the average rate of flow of said agent during any given period of time being proportional to the ratio of the duration of the portion of said period during which said regulator assumes said second condition to the total length of said period, said regulator having an input portion and being operative to assume said first condition, said second condition, or said first condition accordingly as no signal, a resultant signal of one phase, or a resultant signal of opposite phase is applied to said input portion, a first means operative to create an alternating voltage control signal of predetermined frequency having a magnitude which is dependent upon the extent of the difference between the actual value of said controlled variable and a predetermined value thereof, said control signal being of said one phase or of said opposite phase according to the direction of said difference, a second means operative under the control of said regulator to create an alternating voltage folow-up signal of said frequency which gradually changes in character so as to increase in magnitude with said one phase, or to decrease in magnitude with said opposite phase, when said regulator is in said first condition, and to increase in magnitude with said opposite phase, or to decrease in magnitude with said one phase, when said regulator is in said second condition, means operative to apply said follow-up signal to said input portion, whereby said regulator is rendered operative to assume said first and second conditions alternately, a third means operative under the control of said regulator to create an alternating voltage reset signal of said frequency which gradually increases in magnitude toward a maximum value, with a phase which is the same as that of said control signal, as long as the magnitude of the latter is different from zero, and which, upon the subsequent disappearance of said control signal, attains a magnitude which is a function of the extent of the departure of said ratio from a median value and which is of said one phase or a said opposite phase accordingly as said ratio attains a value which is above or below said median value, and means operative to apply said control and reset signals to said input portion to render said regulator responsive to the resultant of said control, follow-up, and reset signals and hence operative to adjust said ratio to said median value when the magnitude of the resultant of said control and reset signals is equal to zero, and to adjust said ratio to a value which is above or below said median value by an amount which is substantially proportional to the magnitude of the last mentioned resultant signal accordingly as the latter is of said one phase or of said opposite phase, whereby the value of said ratio is established as necessary to reduce the magnitude of said control signal to zero and to maintain an equilibrium condition between said follow-up and reset signals.

8. Electrical control apparatus for effecting time-proportioning control with automatic reset action comprising a regulator adapted to regulate the flow of an agent which determines the actual value of a controlled variable and adjustable into alternate first and second conditions corresponding respectively to minimum and maximum instantaneous rates of flow of said agent, the average rate of flow of said agent during any given period of time being proportional to the ratio of the duration of the portion of said period during which said regulator assumes said second condition to the total length of said period, said regulator having an input portion and being operative to assume said first condition, said second condition, or said first condition accordingly as no signal, a resultant signal of one phase, or a resultant signal of opposite phase is applied to said input portion, a first means operative to create an alternating voltage control signal of predetermined frequency having a magnitude which is dependent upon the extent of the difference between the actual value of said controlled variable and a predetermined value thereof, said control signal being of said one phase or of said opposite phase according to the direction of said difference, a second means including first thermally sensitive resistors and operative to create an alternating voltage follow-up signal of said frequency having a magnitude and phase which are respectively dependent upon the magnitude and direction of the difference between the resistances of said first resistors, first means operative under the control of said regulator to heat said first resistors differentially so that said follow-up signal gradually changes in character so as to increase in magnitude with said one phase, or to decrease in magnitude with said opposite phase, when said regulator is in said first condition, and to increase in magnitude with said opposite phase, or to decrease in magnitude with said one phase, when said regulator is in said second condition, means operative to apply said follow-up signal to said input portion, whereby said regulator is rendered operative to assume said first and second conditions alternately, a third means including second thermally sensitive resistors and operative to create an alternating voltage reset signal of said frequency having a magnitude and phase which are respectively dependent upon the magnitude and direction of the difference between the resistances of said second resistors, second means operative under the control of said regulator to heat said second resistors differentially so that said reset signal gradually attains a magnitude which is a function of the extent of the departure of said ratio from a median value and which is of said one phase or of said opposite phase accordingly as said ratio attains a value which is above or below said median value, and means operative to apply said control and reset signals to said input portion to render said regulator responsive to the resultant of said control, follow-up, and reset signals and hence operative to adjust said ratio to said median value when the magnitude of the resultant of said control and reset signals is equal to zero, and to adjust said ratio to a value which is above or below said median value by an amount which is substantially proportional to the magnitude of the last mentioned resultant signal accordingly as the latter is of said one phase or of said opposite phase, whereby the value of said ratio is established as necessary to reduce the magnitude of said control signal to zero and to maintain an equilibrium condition between said follow-up and reset signals.

9. Electrical control apparatus for effecting time-proportioning control with automatic reset action comprising a regulator adapted to regulate the flow of an agent which determines the actual value of a controlled variable and adjustable into alternate first and second conditions corresponding respectively to minimum and maximum instantaneous rates of flow of said agent, the average rate of flow of said agent during any given period of time being proportional to the ratio of the duration of the portion of said period during which said regulator assumes said second condition to the total length of said period, said regulator having an input portion and being operative to assume said first condition, said second condition, or said first condition accordingly as no signal, a resultant signal of one phase, or a resultant signal of opposite phase is applied to said input portion, a first means operative to create an alternating voltage control signal of predetermined frequency having a magnitude which is dependent upon the extent of the difference between the actual value of said controlled variable and a predetermined value thereof, said control signal being of said one phase or of said opposite phase according to the direction of said difference, a second means operative under the control of said regulator to create an alternating voltage follow-up signal of said frequency which gradually changes in character so as to increase in magnitude with said one phase, or to decrease in magnitude with said opposite phase, when said regulator is in said first condition, and to increase in magnitude with said opposite phase, or to decrease in magnitude with said one phase, when said regulator is in said second condition, means operative to apply said followup signal to said input portion, whereby said regulator is rendered operative to assume said first and second conditions alternately and said follow-up signal is caused to vary about a mean value which is zero when said ratio is at a median value, and which increases in one direction or the other as said ratio increases above or decreases below said median value, a third means comprising a first portion operative under the control of said regulator to create an alternating voltage reset signal of said frequency which gradually attains a magnitude which is a function of said mean value of said follow-up signal and which is of said one phase or said opposite phase accordingly as said mean value increases in said one or in said other direction, means operative to apply said control and reset signals to said input portion, said third means including a second portion operative under the control of said regulator and solely in response to said control signal to cause said reset signal to increase with the same phase as said control signal as long as the magnitude of the latter is different from zero, said regulator being responsive to the resultant of said control, follow-up, and reset signals and hence operative to adjust said ratio to said median value when the magnitude of the resultant of said control and reset signals is equal to zero, and to adjust said ratio to a value which is above or below said median value by an amount which is substantially proportional to the magnitude of the last mentioned resultant signal accordingly as the latter is of said one phase or of said opposite phase, whereby the value of said ratio is established as necessary to reduce the magnitude of said control signal to zero and to maintain an equilibrium condition between said follow-up and reset signals.

10. Electrical control apparatus for effecting time-proportioning control with automatic reset action comprising a regulator adapted to restrict to alternate predetermined minimum and maximum rates the flow of an agent which determines the actual value of a controlled variable, the average rate of flow of said agent during any given period of time being proportional to the ratio of the time of maximum flow during said period to the total length of said period, a first balanceable bridge circuit including first variable impedance means and operative to produce an alternating voltage control signal having a magnitude and phase which are respectively dependent upon the extent and direction of bridge unbalance, first means operative to adjust said first impedance means and hence to unbalance said first bridge circuit to an extent and in a direction corresponding respectively to the extent and direction of the difference between the actual value of said controlled variable and a predetermined value thereof, a second balanceable bridge circuit including second variable impedance means and operative to produce an alternating voltage follow-up signal having a magnitude and phase which are respectively dependent upon the extent and direction of unbalance of said second bridge circuit, second means operative to vary said second impedance means slowly and hence to tend to unbalance said second bridge circuit slowly in one direction or the other, accordingly as said regulator causes the flow of said agent at said minimum or said maximum rate, and to an extent dependent upon the duration of the period in which said minimum or said maximum flow rate is produced, a third balanceable bridge circuit including third variable impedance means and operative to produce an alternating voltage reset signal having a magnitude and phase which are respectively dependent upon the extent and direction of unbalance of said third bridge circuit, third means operative to vary said third impedance means gradually and hence to unbalance said third bridge circuit gradually to an extent and in a direction corresponding respectively to the extent and direction of departure of said ratio from a median value, and means operative to apply the resultant of said control, follow-up, and reset signals to said regulator, the latter being operative under the control of said resultant signal to produce said minimum and maximum flow rates alternately and to adjust said ratio to a value which is above or below said median value, depending upon the phase of the resultant of said control and reset signals, by an amount which is substantially proportional to the magnitude of the last mentioned resultant signal, whereby said ratio is established as necessary to reduce said control signal to zero and to maintain an equilibrium condition between said follow-up and reset signals.

11. Apparatus as specified in claim 10, wherein said regulator is adjustable into alternate first and second conditions corresponding respectively to said minimum and maximum rates of flow of said agent and includes an input portion and is operative to assume said first condition, said second condition, or said first condition accordingly as no signal, a resultant signal of one phase, or a resultant signal of opposite phase is applied to said input portion, wherein said control signal has said one phase when said actual value of said controlled variable is less than said predetermined value thereof, wherein said follow-up signal continually changes in a direction to assume said opposite phase while said regulator is in second condition, and wherein said reset signal has said one phase when said ratio is above said median value, whereby the alternate passage of said regulator between said first and second conditions causes said follow-up signal to vary about a mean value which is zero when said ratio is at said median value, and which increases in one direction or the other as said ratio increases above or decreases below said median value.

12. Apparatus as specified in claim 11, wherein said regulator includes a portion operative to produce a cycle time control signal of said one phase or of said opposite phase accordingly as said regulator is in said second or said first condition, and wherein there are included adjustable means connected between the last mentioned portion of said regulator and said input portion thereof and operative to apply to said input portion a selected portion of said cycle time control signal, whereby the total length of each of said periods is determined by the adjustment of said adjustable means.

13. Apparatus as specified in claim 11, wherein said third means comprises a first portion operative to effect said gradual unbalance of said third bridge circuit in accordance with said mean value of said follow-up signal, and comprises a second portion controlled solely by said control signal and operative to vary more rapidly said third impedance means and hence to unbalance said third bridge circuit progressively in the same direction as accomplished by said first portion as long as said control signal has a value other than zero.

14. Apparatus as specified in claim 11, wherein said second impedance means comprises temperature sensitive resistors included in two adjacent arms of said second bridge circuit, wherein said second means includes a separate heating device individual to and thermally associated with each of said resistors and operative to vary the resistance of the associated resistor, wherein said third impedance means comprises temperature sensitive resistors included in two adjacent arms of said third bridge circuit, and wherein said third means includes a thermal coupling between each of the last mentioned resistors and a respective one of said heating devices which is operative to vary the resistance of the associated one of said last mentioned resistors in accordance with the operation of the associated one of said heating devices.

15. Apparatus as specified in claim 11, wherein said second impedance means comprises temperature sensitive resistors included in two adjacent arms of said second bridge circuit, wherein said second means includes a separate heating device individual to and thermally associated with each of said resistors and operative to vary the resistance of the associated resistor, wherein said third impedance means comprises temperature sensitive resistors included in two adjacent arms of said third bridge circuit, and wherein said third means comprises a first portion including a thermal coupling between each of the last mentioned resistors and a respective one of said heating devices and operative to effect said gradual unbalance of said third bridge circuit in accordance with said mean value of said follow-up signal, and comprises a second portion including a separate heating device individual to and thermally associated with each of said last mentioned resistors and operative to vary more rapidly the resistance of the associated one of said last mentioned resistors than is accomplished by the associated one of said thermal couplings, the last mentioned heating devices being controlled solely by said control signal and being operative to unbalance said third bridge circuit, progressively in the same direction as accomplished by said first portion as long as said control signal has a value other than zero.

16. Electrical control apparatus for effecting time-proportioning control with automatic reset action comprising a regulator adapted to regulate the flow of an agent which determines the actual value of a controlled variable and adjustable into alternate first and second conditions corresponding respectively to minimum and maximum instantaneous rates of flow of said agent, the average rate of flow of said agent during any given period of time being proportional to the ratio of the duration of the portion of said period during which said regulator assumes said second condition to the total length of said period, said regulator having an input portion including a pair of input terminals, and being operative to assume said first condition, said second condition, or said first condition accordingly as no signal, a resultant signal of one phase, or a resultant signal of opposite phase is applied to said input portion, a first balanceable bridge circuit including a pair of energizing terminals, a pair of output terminals, and bridge arms interconnecting said bridge terminals, a first resistor included in two adacent arms of said bridge circuit and having an adjustable contact constituting one of said bridge output terminals, a connection including a second resistor connected between the last mentioned terminal and one of said regulator input terminals, a connection between the other of said bridge output terminals and the other of said regulator input terminals, means adapted to connect said bridge energizing terminals to a source of alternating energizing voltage of a predetermined frequency and phase, first means operative to adjust said contact along said first resistor from a point of bridge balance to an extent and in a direction corresponding respectively to the extent and direction of the difference between the actual value of said controlled variable and a predetermined value thereof, a second balanceable bridge circuit including a pair of energizing terminals, a pair of output terminals, one of which is common to said first bridge circuit, and bridge arms interconnecting the terminals of said second bridge circuit, third and fourth resistors included in two adjacent arms of said second bridge circuit and connected together at the other of said second bridge circuit output terminals, a connection including a fifth resistor connected between the last mentioned terminal and said one of said regulator input terminals, connections between said second bridge circuit energizing terminals and those of said first bridge circuit, second means operative slowly to vary the resistances of said third and fourth resistors differentially in one direction or in the opposite direction accordingly as said regulator is in said first or said second condition, thereby to cause said regulator to produce said minimum and maximum flow rates alternately; a third balanceable bridge circuit including a pair of energizing terminals, a pair of output terminals, one of which is common to said common output terminals of said first and second bridge circuits, and bridge arms interconnecting the terminals of said third bridge circuit, sixth and seventh resistors included in two adjacent arms of said third bridge circuit and connected together at the other of said third bridge circuit output terminals, a connection including an eighth resistor connected between the last mentioned terminal and said one of said regulator input terminals, connections between said third bridge circuit energizing terminals and those of said first and second bridge circuits, and third means operative gradually to vary the resistances of said sixth and seventh resistors differentially in one direction or in the opposite direction accordingly as said ratio increases above or decreases below a median value, whereby said ratio is established as necessary to maintain said first bridge circuit balanced and to maintain an equilibrium condition between the average difference between the differential resistances of said third and fourth resistors and the difference between the resistances of said sixth and seventh resistors.

17. Apparatus as specified in claim 16, wherein the resistors included in the arms of said second and third bridge circuits have substantial temperature coefficients of resistance, wherein said second means includes a separate heating device individual to and thermally associated with each of said third and fourth resistors, and wherein said third means includes a thermal coupling between each of said sixth and seventh resistors and a respective one of said heating devices which is operative to vary the resistance of the associated one of the last mentioned resistors in accordance with the operation of the associated one of said heating devices.

18. Apparatus as specified in claim 17, wherein said third means also includes a separate heating device individual to and thermally associated with each of said sixth and seventh resistors and operative to vary more rapidly the resistance of the associated one of the last mentioned resistors than is accomplished by the associated one of said thermal couplings, and wherein there is included a device connected to the output terminals of said first bridge circuit and operative to control the last mentioned heating devices solely in accordance with the extent and direction of said difference between said actual and predetermined values of said controlled variable.

19. Electrical control apparatus for effecting time-proportioning control with automatic reset action comprising a regulator adapted to regulate the flow of an agent which determines the actual value of a controlled variable and adjustable into alternate first and second conditions corresponding respectively to minimum and maximum instantaneous rates of flow of said agent, the average rate of flow of said agent during any given period of time being proportional to the ratio of the duration of the portion of said period during which said regulator assumes said second condition to the total length of said period, said regulator having an output portion and having an input portion including a pair of input terminals and being operative to assume said first condition, said second condition, or said first condition accordingly as no signal, a resultant signal of one phase, or a resultant signal of opposite phase is applied to said input portion, first and second energizing conductors adapted to be connected to a source of alternating energizing voltage of a predetermined frequency and of said one phase, a first resistor connected between said energizing conductors and having an adjustable contact, first means operative to adjust said contact along said first resistor from the mid-point thereof to an extent and in a direction corresponding respectively to the extent and direction of the difference between the actual value of said controlled variable and a predetermined value thereof, a connection including a second resistor connected between said contact and one of said regulator input terminals, center-tapped means connected between said energizing conductors, a connection between said center-tap and the other of said regulator input terminals, whereby said regulator tends to assume said first, said second, or said first condition accordingly as said actual value of said controlled variable is above, below, or at said predetermined value thereof, third and fourth follow-up resistors having substantial temperature coefficients of resistance connected in series between said energizing conductors and joined at a first junction, said third resistor being connected to said first energizing conductor, a connection including a fifth resistor connected between said first junction and said one regulator input terminal, whereby said regulator tends to assume said first, said second, or said first condition accordingly as the resistance of said third resistor is greater than, less than, or equal to that of said fourth resistor, first and second heaters respectively thermally coupled to said third and fourth resistors and connected to said regulator output portion, the latter being operative to energize said first heater, but not said second heater, at all times at which said regulator is in said first condition, and to energize said second heater, but not said first heater, at all times at which said regulator is in said second condition, sixth and seventh reset resistors having substantial temperature coefficients of resistance connected in series between said energizing conductors and joined at a second junction, said sixth resistor being connected to said second energizing conductor, a separate high capacitance thermal device thermally coupled to each of said sixth and seventh resistors, a connection including an eighth resistor connected between said second junction and said one regulator input terminal, whereby said regulator tends to assume said first, said second, or said first condition accordingly as the resistance of said sixth resistor is less than, greater than, or equal to that of said seventh resistor, a thermal coupling between said sixth resistor and said first heater, and a thermal coupling between said seventh resistor and said second heater, each of the last mentioned two thermal couplings having a lower conductance than the first mentioned thermal coupling between the corresponding thermally coupled heater and follow-up resistor, whereby said ratio is established as necessary to maintain said contact at said mid-point of said first resistor and to maintain an equilibrium condition between the difference between the resistances of said third and fourth resistors and the difference between the resistances of said sixth and seventh resistors.

20. Apparatus as specified in claim 19, wherein said regulator output portion includes an output terminal and means operative to connect said output terminal to said first energizing conductor at all times at which said regulator is in said second condition, and to connect said output terminal to said second energizing conductor at all times at which said regulator is in said first condition, and wherein there is included a cycle time control connection between said regulator output terminal and said one regulator input terminal.

21. Apparatus as specified in claim 20, wherein said cycle time control connection includes a cycle time control resistor having an adjustable contact, a connection between the last mentioned contact and said one regulator input terminal, a connection between one end terminal of the last mentioned resistor and said other regulator input terminal, and a connection between the other end terminal of said last mentioned resistor and said regulator output terminal, whereby the total length of each of said periods is determined by the position of said last mentioned contact along said last mentioned resistor.

22. Apparatus as specified in claim 19, wherein said regulator includes an electromagnetic relay device having an operating portion connected to said regulator input terminals and having contact means connected in said regulator output portion, said contact means comprising a follow-up portion including a movable contact and cooperating normally open and normally closed relatively stationary contacts, and comprising a load controlling portion including a movable contact and a cooperating normally open relatively stationary contact, said movable follow-up contact being operative to engage only said normally closed follow-up contact when said regulator is in said first condition, and each of said movable contacts being operative to engage only the cooperating normally open stationary contact when said regulator is in said second condition, and wherein there are included a connection between said normally open follow-up contact, one end terminal of said first heater, and said first energizing conductor, a connection between said normally closed follow-up contact, one end terminal of said second heater, and said second energizing conductor, a connection between the other end terminal of each of said heaters and said movable follow-up contact, and connections adapted to cause the engagement of said load controlling contacts to effect the flow of said agent at said maximum instantaneous rate and to cause the disengagement of said load controlling contacts to effect the flow of said agent at said minimum instantaneous rate.

23. Apparatus as specified in claim 22, wherein said load controlling contacts are adapted to be connected in series between one of the terminals of a source of load energizing voltage and one of the terminals of a load device operative to regulate the actual value of said condition in accordance with the average rate of flow of said agent, the other terminals of the load device and the last mentioned source being connected together.

24. Apparatus as specified in claim 22, wherein there is included a cycle time control resistor having an adjustable contact, a connection between the last mentioned contact and said one regulator input terminal, a connection between one end terminal of the last mentioned resistor and said other regulator input terminal, and a connection between the other end terminal of said last mentioned resistor and said movable follow-up contact, whereby the total length of each of said periods is determined by the position of said last mentioned contact along said last mentioned resistor.

25. Apparatus as specified in claim 22, wherein said regulator also includes a safe-failure electromagnetic relay device having an operating portion connected to said regulator input terminals and having safe-failure contact means connected in said regulator output portion, said safe-failure contact means including a movable contact and a cooperating normally closed relatively stationary contact, the last mentioned movable contact being operative to engage the cooperating normally closed contact when no signal or a resultant signal of said one phase is applied to said regulator input portion, and to disengage the cooperating normally closed contact when a resultant signal of said opposite phase is applied to said regulator input portion, and wherein said safe-failure contacts are connected in series with said load controlling contacts, whereby the flow of said agent at said maximum instantaneous rate can occur only when said safe-failure contacts are in engagement.

26. Apparatus as specified in claim 19, wherein said regulator includes an electronic amplifier having an input portion connected between said regulator input terminals and having an output portion, first and second electron tubes, each including an input portion and an output portion, a connection between each of said tube input portions and said amplifier output portion, an electromagnetic control relay having an operating winding and having contact means connected in said regulator output portion, connections operative to connect said winding in series with the output portion of said first tube between a pair of terminals adapted to be connected to a source of alternating energizing voltage of said predetermined frequency and of said one phase, an electromagnetic safe-failure relay having an operating winding and having contact means connected in said regulator output portion, connections operative to connect the last mentioned winding in series with the output portion of said second tube between a pair of terminals adapted to be connected to a source of alternating energizing voltage of said predetermined frequency and of said opposite phase, said first tube being rendered operative to energize operatively said control relay when and only when a resultant signal of said one phase is applied to said regulator input portion, and to prevent the operative energization of said control relay when no signal or a resultant signal of said opposite phase is applied to said regulator input portion, said second tube being rendered operative to energize operatively said safe-failure relay when and only when a resultant signal of said opposite phase is applied to said regulator input portion, and to prevent the operative energization of said safe-failure relay when no signal or a resultant signal of said one phase is applied to said regulator input portion, said control relay contact means comprising a follow-up portion including a movable contact and cooperating normally open and normally closed relatively stationary contacts, and comprising a load controlling portion including a movable contact and a cooperating normally open relatively stationary contact, said movable follow-up contact being operative to engage only said normally closed follow-up contact at all times at which said control relay is not operatively energized, and each of said movable contacts being operative to engage only the cooperating normally open stationary contact at all times at which said control relay is operatively energized, said safe-failure relay contact means including a movable contact and a cooperating normally closed relatively stationary contact, said safe-failure contacts being in engagement at all times at which said safe-failure relay is not operatively energized and being out of engagement at all times at which said safe-failure relay is operatively energized, and wherein there are included a connection between said normally open follow-up contact, one end terminal of said first heater, and said first energizing conductor, a connection between said normally closed follow-up contact, one end terminal of said second heater, and said second energizing conductor, a connection between the other end terminal of each of said heaters and said movable follow-up contact, and connections adapted to connect said load controlling contacts and said safe-failure contacts in series between one of the terminals of a source of load energizing voltage and one of the terminals of a load device operative to regulate the actual value of said condition in accordance with the average rate of flow of said agent, the other terminals of the load device and the last mentioned source being connected together, whereby said regulator can assume said second condition only when said safe-failure relay is de-energized and said control relay is energized.

27. Apparatus as specified in claim 19, wherein there are included third and fourth reset heaters respectively thermally coupled to said sixth and seventh reset resistors, each of the last mentioned two thermal couplings having a higher conductance than the aforementioned coupling between the corresponding reset resistor and thermally coupled follow-up heater, and reset control means having an input portion connected between said adjustable contact of said first resistor and said center-tap and having an output portion connected to said third and fourth heaters, said reset control means being operative to effect the equal energization of said third and fourth heaters when said adjustable contact is at the midpoint of said first resistor and to energize said third or said fourth heater to a greater extent than said fourth or said third heater accordingly as said actual value of said controlled variable increases above or decreases below said predetermined value, the magnitude of the differential energization of said third and fourth heaters being a function of the extent of said difference between said actual and predetermined values of said controlled variable.

28. Apparatus as specified in claim 27, wherein said reset control means comprises an electronic reset amplifier having an output portion and having an input portion connected between said adjustable contact and said center-tap, and wherein said reset amplifier includes first and second electron tubes each having an input portion connected to said amplifier output portion and each having an output portion, connections operative to connect said fourth heater in series with the output portion of said first tube between a pair of terminals adapted to be connected to a source of alternating energizing voltage of said predetermined frequency and of said one phase, and connections operative to connect said third heater in series with the output portion of said second tube between a pair of terminals adapted to be connected to a source of alternating energizing voltage of said predetermined frequency and of said opposite phase, said tubes being operative to conduct substantially equal currents when no input signal is applied to said amplifier input portion, and said first tube or said second tube being operative to conduct a larger current than said second tube or said first tube accordingly as an input signal of said one phase or of said opposite phase is applied to said amplifier input portion.

29. Apparatus as specified in claim 27, wherein said reset control means comprises an electronic reset amplifier having an output portion and having an input portion connected between said adjustable contact and said center-tap, and wherein said reset amplifier includes first and second electron tubes each having an input portion connected to said amplifier output portion and each having an output portion, connections operative to connect said fourth heater in series with the output portion of said first tube between a pair of terminals adapted to be connected to a source of alternating energizing voltage of said predetermined frequency and of said one phase, connections operative to connect said third heater in series with the output portion of said second tube between a pair of terminals adapted to be connected to a source of alternating energizing voltage of said predetermined frequency and of said opposite phase, said tubes being operative to conduct substantially equal currents when no input signal is applied to said amplifier input portion, and said first tube or said second tube being operative to conduct a larger current than said second tube or said first tube accordingly as an input signal of said one phase or of said opposite phase is applied to said amplifier input portion, and an adjustable reset rate control resistor connected in said reset amplifier between the input and output portions thereof and operative to determine the magnitude of the differential energization of said third and fourth heaters for any given magnitude of the signal applied to said amplifier input portion.

30. Apparatus as specified in claim 27, wherein said reset control means comprises an electronic reset amplifier having an output portion and having an input portion connected between said adjustable contact and said center-tap, and wherein said reset amplifier includes first and second electron tubes each having an input portion connected to said amplifier output portion and each having an output portion, connections operative to connect said fourth heater in series with the output portion of said first tube between a pair of terminals adapted to be connected to a source of alternating energizing voltage of said predetermined frequency and of said one phase, connections operative to connect said third heater in series with the output portion of said second tube between a pair of terminals adapted to be connected to a source of alternating energizing voltage of said predetermined frequency and of said opposite phase, said tubes being operative to conduct substantially equal currents when no input signal is applied to said amplifier input portion and said first tube or said second tube being operative to conduct a larger current than said second tube or said first tube accordingly as an input signal of said one phase or of said opposite phase is applied to said amplifier input portion, and an adjustable approach rate control resistor connected in series in the output circuit of said first tube and operative to limit the energization of said fourth heater in the presence of an amplifier signal of said one phase without significantly limiting the energization of said third heater in the presence of an amplifier input signal of the same magnitude but of said opposite phase.

31. Apparatus as specified in claim 27, wherein said third resistor, said sixth resistor, the associated one of said high capacitance thermal devices, said first heater, and said third heater are included in a first thermal unit comprising a closed metallic, shell-like container of good thermal conductance, wherein the last mentioned thermal device comprises a solid member of metal having a high specific heat supported centrally within said container, wherein said third heater comprises a heater winding wound on the surface of said solid member over a substantial portion thereof, wherein said sixth resistor is mounted on the surface of said solid member in good heat transfer relationship therewith, wherein said third resistor is mounted adjacent said solid member on the interior of said container in good heat transfer relationship therewith, wherein said first heater comprises a heater winding wound on the exterior of said container over substantially the entire length thereof, wherein said solid member, said third heater winding, and said sixth resistor are thermally insulated from the remainder of the elements of said first thermal unit, wherein said fourth resistor, said seventh resistor, the associated one of said high capacitance thermal devices, said second heater, and said fourth heater are included in a second thermal unit comprising a closed, metallic, shell-like container of good thermal conductance, wherein the last mentioned thermal device comprises a solid member of metal having a high specific heat and supported centrally within the last mentioned container, wherein said fourth heater comprises a heater winding wound on the surface of the last mentioned solid member over a substantial portion thereof, wherein said seventh resistor is mounted on the surface of said last mentioned solid member in good heat transfer relationship therewith, wherein said fourth resistor is mounted adjacent said last mentioned solid member on the interior of said last mentioned container in good heat transfer relationship therewith, wherein said second heater comprises a heater winding wound on the exterior of said last mentioned container over substantially the entire length thereof, and wherein said last mentioned solid member, said fourth heater winding, and said seventh resistor are thermally insulated from the remainder of the elements of said second thermal unit.

32. Apparatus as specified in claim 31, wherein each of said thermal units includes an outer metallic shell of good thermal conductance surrounding the corresponding heater winding over substantially the entire length thereof.

33. Apparatus operative to cause a device to assume a first operating condition during predetermined portions of recurring periods such that the ratio of the length of each portion to the length of the total period bears a relationship to the magnitude and sense of a quantity, comprising a device having said first operating condition and a second operating condition, a first means operative to create an alternating voltage control signal having a magnitude and phase which are respectively dependent upon the magnitude and sense of a quantity, a second means operative under the control of said device to create an alternating voltage follow-up signal which gradually changes in character in a predetermined manner with changes in said ratio, a third means operative under the control of said device to create an alternating voltage resetting signal which gradually attains a magnitude and phase which are respective functions of the extent and direction of departure of said ratio from a median value, and means operative to apply the resultant of said control, follow-up, and resetting signals to said device, the latter being operative under the control of said resultant signal to assume said first and second operating conditions alternately and to adjust said ratio to a value which is above or below said median value, depending upon the phase of the resultant of said control and resetting signals, by an amount which is substantially proportional to the magnitude of the last mentioned resultant signal, whereby said ratio is established in accordance with the magnitude and sense of said quantity.

34. Apparatus operative to cause a device to assume a first operating condition during predetermined portions of recurring periods such that the ratio of the length of each portion to the length of the total period bears a relationship to the magnitude and sense of a quantity, comprising a device having an input portion and operative to assume a second operating condition, said first operating condition, or said second operating condition accordingly as no signal, a resultant signal of one phase, or a resultant signal of opposite phase is applied to said input portion, a first balanceable bridge circuit including first variable impedance means and operative to produce an alternating voltage control signal having a magnitude and phase which are respectively dependent upon the extent and direction of bridge unbalance, first means operative to adjust said first impedance means and hence to unbalance said first bridge circuit to an extent and in a direction corresponding respectively to the magnitude and sense of a quantity, a second balanceable bridge circuit including second variable impedance means and operative to produce an alternating voltage follow-up signal having a magnitude and phase which are respectively dependent upon the extent and direction of unbalance of said second bridge circuit, second means operative to vary said second impedance means slowly and hence to tend to unbalance said second bridge circuit slowly in one direction or the other, accordingly as said device assumes said first or said second operating condition, and to an extent dependent upon the duration of the period in which said first or said second operating condition is assumed, a third balanceable bridge circuit including third variable impedance means and operative to produce an alternating voltage resetting signal having a magnitude and phase which are respectively dependent upon the extent and direction of unbalance of said third bridge circuit, third means operative to vary said third impedance means gradually and hence to unbalance said third bridge circuit gradually to an extent and in a direction corresponding respectively to the extent and direction of departure of said ratio from a median value, and means operative to apply the resultant of said control, follow-up and resetting signals to said input portion of said device, the latter being operative under the control of said resultant signal to assume said first and second operating conditions alternately and to adjust said ratio to a value which is above or below said median value, depending upon the phase of the resultant of said control and resetting signals, by an amount which is substantially proportional to the magnitude of the last mentioned resultant signal, whereby said ratio is established in accordance with the magnitude and sense of said quantity.

35. Apparatus operative to cause a device to assume a first operating condition during predetermined portions of recurring periods such that the ratio of the length of each portion to the length of the total period bears a relationship to the magnitude and sense of a quantity, comprising a device having an output portion and having an input portion including a pair of input terminals and being operative to assume a second operating condition, said first operating condition, or said second operating condition accordingly as no signal, a resultant signal of one phase, or a resultant signal of opposite phase is applied to said input portion, first and second energizing conductors adapted to be connected to a source of alternating energizing voltage of a predetermined frequency and of said one phase, a first resistor connected between said energizing conductors and having an adjustable contact, first means operative to adjust said contact along said first resistor from the mid-point thereof to an extent and in a direction corresponding respectively to the magnitude and sense of a quantity, a connection including a second resistor connected between said contact and one of said device input terminals, center-tapped means connected between said energizing conductors, a connection between said center-tap and the other of said device input terminals, whereby said device tends to assume said first or said second operating condition depending upon the magnitude and sense of said quantity, third and fourth follow-up resistors having substantial temperature coefficients of resistance connected in series between said energizing conductors and joined at a first junction, said third resistor being connected to said first energizing conductor, a connection including a fifth resistor connected between said first junction and said one device input terminal, whereby said device tends to assume said second, said first, or said second operating condition accordingly as the resistance of said third resistor to greater than, less than, or equal to that of said fourth resistor, first and second heaters respectively thermally coupled to said third and fourth resistors and connected to said device output portion, the latter being operative to energize said first heater, but not said second heater, at all times at which said device is in said second operating condition, and to energize said second heater, but not said first heater, at all times at which said device is in said first operating condition, sixth and seventh resetting resistors having substantial temperature coefficients of resistance connected in series between said energizing conductors and joined at a second junction, said sixth resistor being connected to said second energizing conductor, a separate high capacitance thermal device thermally coupled to each of said sixth and seventh resistors, a connection including an eighth resistor connected between said second junction and said one device input terminal, whereby said device tends to assume said second, said first, or said second operating condition accordingly as the resistance of said sixth resistor is less than, greater than, or equal to that of said seventh resistor, a thermal coupling between said sixth resistor and said first heater, and a thermal coupling between said seventh resistor and said second heater, each of the last mentioned two thermal couplings having a lower conductance than the first mentioned thermal coupling between the corresponding thermally coupled heater and follow-up resistor, whereby said ratio is established in accordance with the magnitude and sense of said quantity.

36. Electrical control apparatus for effecting time-proportioning control with automatic reset action comprising a regulator adapted to restrict to alternate predetermined minimum and maximum rates the flow of an agent which determines the actual value of a controlled variable, the average rate of flow of said agent during any given period of time being proportional to the ratio of the time of maximum flow during said period to the total length of said period, a first means operative to create a control signal having a magnitude and sense which are respectively dependent upon the extent and direction of the difference between the actual value of said controlled variable and a predetermined value thereof, a second means operative under the control of said regulator to create a follow-up signal which gradually changes in magnitude and shifts in sense in a predetermined manner with changes in said ratio, a third means operative under the control of said regulator to create a reset signal which gradually attains a magnitude and sense which are respective functions of the extent and direction of departure of said ratio from a median value, and means operative to apply the resultant of said control, follow-up, and reset signals to said regulator, the latter being operative under the control of said resultant signal to produce said minimum and maximum flow rates alternately and to adjust said ratio to a value which is above or below said median value, depending upon the phase of the resultant of said control and reset signals, by an amount which is substantially proportional to the magnitude of the last mentioned resultant signal, whereby said ratio is established as necessary to reduce said control signal to zero and to maintain an equilibrium condition between said follow-up and reset signals.

37. Electrical control apparatus for effecting time-proportioning control with automatic reset action comprising a regulator adapted to regulate the flow of an agent which determines the actual value of a controlled variable and adjustable into alternate first and second conditions corresponding respectively to minimum and maximum instantaneous rates of flow of said agent, the average rate of flow of said agent during any given period of time being proportional to the ratio of the duration of the portion of said period during which said regulator assumes said second condition to the total length of said period, said regulator having an output portion and having an input portion including a pair of input terminals and being operative to assume said first condition, said second condition, or said first condition accordingly as no signal, a resultant signal of one sense, or a resultant signal or opposite sense is applied to said input portion, first and second energizing conductors adapted to be connected to a source of energizing voltage of said one sense, a first resistor connected between said energizing conductors and having an adjustable contact, first means operative to adjust said contact along said first resistor from the mid-point thereof to an extent and in a direction corresponding respectively to the extent and direction of the difference between the actual value of said controlled variable and a predetermined value thereof, a connection including a second resistor connected between said contact and one of said regulator input terminals, center-tapped means connected between said energizing conductors, a connection between said center-tap and the other of said regulator input terminals, whereby said regulator tends to assume said first, said second, or said first condition accordingly as said actual value of said controlled variable is above, below, or at said predetermined value thereof, third and fourth follow-up resistors having substantial temperature coefficients of resistance connected in series between said energizing conductors and joined at a first junction, said third resistor being connected to said first energizing conductor, a connection including a fifth resistor connected between said first junction and said one regulator input terminal, whereby said regulator tends to assume said first, said second, or said first condition accordingly as the resistance of said third resistor to greater than, less than, or equal to that of said fourth resistor, first and second heaters respectively thermally coupled to said third and fourth resistors and connected to said regulator output portion, the latter being operative to energize said first heater, but not said second heater, at all times at which said regulator is in said first condition, and to energize said second heater, but not said first heater, at all times at which said regulator is in said second condition, sixth and seventh reset resistors having substantial temperature coefficients of resistance connected in series between said energizing conductors and joined at a second junction, said sixth resistor being connected to said second energizing conductor, a separate high capacitance thermal device thermally coupled to each of said sixth and seventh resistors, a connection including an eighth resistor connected between said second junction and said one regulator input terminal, whereby said regulator tends to assume said first, said second, or said first condition accordingly as the resistance of said sixth resistor is less than, greater than, or equal to that of said seventh resistor, a thermal coupling between said sixth resistor and said first heater, and a thermal coupling between said seventh resistor and said second heater, each of the last mentioned two thermal couplings having a lower conductance than the first mentioned thermal coupling between the corresponding thermally coupled heater and follow-up resistor, whereby said ratio is established as necessary to maintain said contact at said mid-point of said first resistor and to maintain an equilibrium condition between the difference between the resistances of said third and fourth resistors and the difference between the resistances of said sixth and seventh resistors.

ROBERT J. EHRET.
ROGER F. WERNLUND.

References Cited in the file of this patent

UNITED STATES PATENTS

| Number | Name | Date |
| --- | --- | --- |
| 2,050,633 | Stallard | Aug. 11, 1936 |
| 2,291,342 | Livingston | July 28, 1942 |
| 2,301,008 | Baldwin | Nov. 3, 1942 |
| 2,495,844 | Hornfeck | Jan. 31, 1950 |
| 2,511,219 | Pogorzelski | June 13, 1950 |